United States Patent
Tanaka

(10) Patent No.: US 10,663,480 B2
(45) Date of Patent: May 26, 2020

(54) PHYSICAL QUANTITY SENSOR, ELECTRONIC APPARATUS, AND VEHICLE

(71) Applicant: Seiko Epson Corporation, Tokyo (JP)

(72) Inventor: Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 160 days.

(21) Appl. No.: 15/910,419

(22) Filed: Mar. 2, 2018

(65) Prior Publication Data
US 2018/0275162 A1     Sep. 27, 2018

(30) Foreign Application Priority Data
Mar. 27, 2017   (JP) ................................. 2017-061699

(51) Int. Cl.
| | | |
|---|---|---|
| G01P 15/125 | (2006.01) | |
| G01C 21/10 | (2006.01) | |
| G01C 21/00 | (2006.01) | |
| G01P 15/18 | (2013.01) | |
| G01P 15/08 | (2006.01) | |

(52) U.S. Cl.
CPC .......... G01P 15/125 (2013.01); G01C 21/005 (2013.01); G01C 21/10 (2013.01); G01P 15/18 (2013.01); *B60Y 2400/304* (2013.01); *G01P 2015/0831* (2013.01)

(58) Field of Classification Search
CPC . G01P 15/125; G01P 15/131; G01C 19/5769; G01C 19/5755
See application file for complete search history.

(56) References Cited

U.S. PATENT DOCUMENTS

| | | | |
|---|---|---|---|
| 5,581,035 A | * | 12/1996 | Greiff ................. G01P 15/0802 |
| | | | 324/688 |
| 6,739,193 B2 | | 5/2004 | Franz et al. |
| 8,539,836 B2 | | 9/2013 | McNeil |
| 2003/0115960 A1 | | 6/2003 | Franz et al. |
| 2012/0186347 A1 | | 7/2012 | McNeil |

(Continued)

FOREIGN PATENT DOCUMENTS

| | | |
|---|---|---|
| JP | 2003-519384 A | 6/2003 |
| JP | 2015-031644 A | 2/2015 |

(Continued)

OTHER PUBLICATIONS

Extended European Search Report for Patent Application No. EP 18163591.3 dated Jun. 28, 2018 (5 pages).

*Primary Examiner* — Helen C Kwok

(74) *Attorney, Agent, or Firm* — Harness, Dickey & Pierce, P.L.C.

(57) ABSTRACT

A physical quantity sensor includes: a movable body; a support that supports the movable body via a coupler; a substrate that is disposed so as to overlap the movable body in a plan view and is provided with a first fixed electrode and a second fixed electrode thereon along a first direction orthogonal to a longitudinal direction of the coupler; a third fixed electrode that does not overlap the movable body in the plan view, is electrically connected with any one of the first fixed electrode and the second fixed electrode, and is provided on the substrate; and a first dummy electrode that is disposed next to the third fixed electrode in the plan view, is at the same potential as the movable body, and is provided on the substrate.

20 Claims, 21 Drawing Sheets

(56) References Cited

U.S. PATENT DOCUMENTS

| | | | |
|---|---|---|---|
| 2013/0229193 A1* | 9/2013 | Kakimoto | G01R 27/2605 |
| | | | 324/661 |
| 2014/0090469 A1* | 4/2014 | Comi | G01P 15/097 |
| | | | 73/504.12 |
| 2014/0338451 A1* | 11/2014 | Takagi | G01P 15/125 |
| | | | 73/514.32 |
| 2015/0040667 A1* | 2/2015 | Tanaka | G01P 15/125 |
| | | | 73/514.32 |
| 2015/0241466 A1* | 8/2015 | Tanaka | G01P 15/125 |
| | | | 73/514.32 |
| 2015/0298967 A1* | 10/2015 | Tanaka | G01P 15/125 |
| | | | 257/418 |
| 2016/0041198 A1* | 2/2016 | Tanaka | G01P 15/125 |
| | | | 73/514.32 |
| 2016/0047839 A1* | 2/2016 | Tanaka | G01P 15/125 |
| | | | 73/514.32 |
| 2016/0061858 A1* | 3/2016 | Tanaka | G01P 15/131 |
| | | | 73/514.18 |
| 2016/0209442 A9 | 7/2016 | Tanaka | |
| 2016/0349286 A1* | 12/2016 | Ullrich | G01P 15/125 |
| 2018/0273375 A1* | 9/2018 | Tanaka | B81C 1/00166 |

FOREIGN PATENT DOCUMENTS

| | | |
|---|---|---|
| JP | 2015-031645 A | 2/2015 |
| JP | 5852437 B2 | 12/2015 |
| JP | 2016-044979 A | 4/2016 |
| WO | WO-2010-027600 A2 | 3/2010 |

\* cited by examiner

PHYSICAL QUANTITY SENSOR, ELECTRONIC APPARATUS, AND VEHICLE

BACKGROUND

1. Technical Field

The present invention relates to a physical quantity sensor, an electronic apparatus, and a vehicle.

2. Related Art

In recent years, a physical quantity sensor that detects a physical quantity such as acceleration has been developed using, for example, a silicon micro-electro-mechanical systems (MEMS) technique.

For example, JP-A-2016-44979 discloses a physical quantity sensor including a first fixed electrode, a second fixed electrode, a movable body, a first pad electrically connected with the movable body, a second pad electrically connected with the second fixed electrode, and a third pad electrically connected with the first fixed electrode. The physical quantity sensor detects acceleration based on a first capacitance detected using the first pad and the second pad, and a second capacitance detected using the first pad and the third pad. Further, JP-A-2016-44979 discloses that a dummy electrode is provided to prevent sticking and a reduction in a capacitance offset.

In the physical quantity sensor described above, however, the capacitance offset may not be reduced by only providing the dummy electrode because of the influence of, for example, a wiring that connects the pad with the fixed electrode or the movable body, or another sensor (e.g., a gyro sensor or an acceleration sensor that detects acceleration in another axial direction) provided on the same substrate.

SUMMARY

An advantage according to some aspects of the invention is to provide a physical quantity sensor in which a capacitance offset can be reduced. Another advantage according to some aspects of the invention is to provide an electronic apparatus including the physical quantity sensor. Still another advantage according to some aspects of the invention is to provide a vehicle including the physical quantity sensor.

The invention can be implemented as the following aspects or application examples.

APPLICATION EXAMPLE 1

A physical quantity sensor according to this application example includes: a substrate; a movable body that is displaced about a support axis in response to a physical quantity; a first fixed electrode that is fixed to the substrate, overlaps the movable body in a plan view, and is provided on one side of the support axis in a direction crossing an extending direction thereof; a second fixed electrode that is fixed to the substrate, overlaps the movable body in the plan view, and is provided on the other side of the support axis in the direction crossing the extending direction thereof; a third fixed electrode that is fixed to the substrate, does not overlap the movable body in the plan view, and is electrically connected with the first fixed electrode or the second fixed electrode; and a first dummy electrode that is fixed to the substrate, is provided next to the third fixed electrode, and is at the same potential as the movable body.

In the physical quantity sensor, a capacitance can be formed by the third fixed electrode and the first dummy electrode, and thus a capacitance offset can be reduced.

APPLICATION EXAMPLE 2

In the physical quantity sensor according to the application example, the third fixed electrode may have a shape having a longitudinal direction so as to be along the extending direction of the support axis in the plan view, the first dummy electrode may include a first arm that is provided on one side of the third fixed electrode in the direction crossing the extending direction of the support axis, a second arm that is provided on the other side of the third fixed electrode in the direction crossing the extending direction of the support axis, and a third arm that is provided on one side of the third fixed electrode in the extending direction of the support axis and connects the first arm with the second arm.

In the physical quantity sensor with this configuration, the capacitance formed by the third fixed electrode and the first dummy electrode can be increased, compared to, for example, the case where the first dummy electrode only includes the first arm.

APPLICATION EXAMPLE 3

In the physical quantity sensor according to the application example, the movable body may include a first movable section that is located on the one side of the support axis in the direction crossing the extending direction thereof, and a second movable section that is located on the other side of the support axis in the direction crossing the extending direction thereof and is shorter in length in the direction crossing the extending direction of the support axis than the first movable section, the first fixed electrode may overlap the first movable section in the plan view, and the second fixed electrode may overlap the second movable section in the plan view.

In the physical quantity sensor with this configuration, when acceleration in the vertical direction is applied, a rotation moment of the first movable section and a rotation moment of the second movable section can be unbalanced. Hence, in the physical quantity sensor, when the acceleration in the vertical direction is applied, the movable body can be inclined at a predetermined angle.

APPLICATION EXAMPLE 4

In the physical quantity sensor according to the application example, the physical quantity sensor may further include a second dummy electrode that is fixed to the substrate, overlaps the first movable section in the plan view, and is at the same potential as the movable body.

In the physical quantity sensor with this configuration, the movable body can be prevented from sticking to the substrate.

APPLICATION EXAMPLE 5

In the physical quantity sensor according to the application example, the third fixed electrode may be provided on the other side of the support axis in the direction crossing the extending direction thereof in the plan view, the second fixed electrode may be provided between the first fixed electrode and the third fixed electrode, and the first dummy electrode may be provided between the second fixed electrode and the third fixed electrode.

In the physical quantity sensor with this configuration, a capacitance can be formed by the second fixed electrode and the first dummy electrode.

APPLICATION EXAMPLE 6

In the physical quantity sensor according to the application example, the third fixed electrode may be provided on the one side of the support axis in the direction crossing the extending direction thereof in the plan view, the second dummy electrode may be provided between the first fixed electrode and the third fixed electrode, and the first dummy electrode and the second dummy electrode may be connected together.

In the physical quantity sensor with this configuration, a capacitance can be formed by the third fixed electrode and the first dummy electrode, and thus a capacitance offset can be reduced.

APPLICATION EXAMPLE 7

In the physical quantity sensor according to the application example, the physical quantity sensor may further include a third dummy electrode that is fixed to the substrate, overlaps the movable body in the plan view, and is at the same potential as the movable body, and the third dummy electrode may be provided between the first fixed electrode and the second fixed electrode.

In the physical quantity sensor with this configuration, the sticking of the movable body to the substrate can be more reliably reduced.

APPLICATION EXAMPLE 8

In the physical quantity sensor according to the application example, two movable bodies may be provided, and the two movable bodies may be arranged so as to be along the direction crossing the extending direction of the support axis.

In the physical quantity sensor with this configuration, even when acceleration containing a component in the vertical direction and a component in another axial direction is applied, the component in another axial direction can be canceled by differential detection. Hence, in the physical quantity sensor, acceleration in the vertical direction can be accurately detected.

APPLICATION EXAMPLE 9

In the physical quantity sensor according to the application example, two movable bodies may be provided, and the two movable bodies may be arranged so as to be along the extending direction of the support axis.

In the physical quantity sensor with this configuration, even when acceleration containing a component in the vertical direction and a component in another axial direction is applied, the component in another axial direction can be canceled by differential detection. Hence, in the physical quantity sensor, acceleration in the vertical direction can be accurately detected.

APPLICATION EXAMPLE 10

An electronic apparatus according to this application example includes the physical quantity sensor according to the application example.

The electronic apparatus can include the physical quantity sensor according to the application example.

APPLICATION EXAMPLE 11

A vehicle according to this application example includes the physical quantity sensor according to the application example.

The vehicle can include the physical quantity sensor according to the application example.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, preferred embodiments of the invention will be described in detail with reference to the drawings. The embodiments described below do not unduly limit the details of the invention set forth in the appended claims. Moreover, not all of the configurations described below are indispensable configuration requirements of the invention.

1. First Embodiment 1.1. Physical Quantity Sensor

Figure 1:
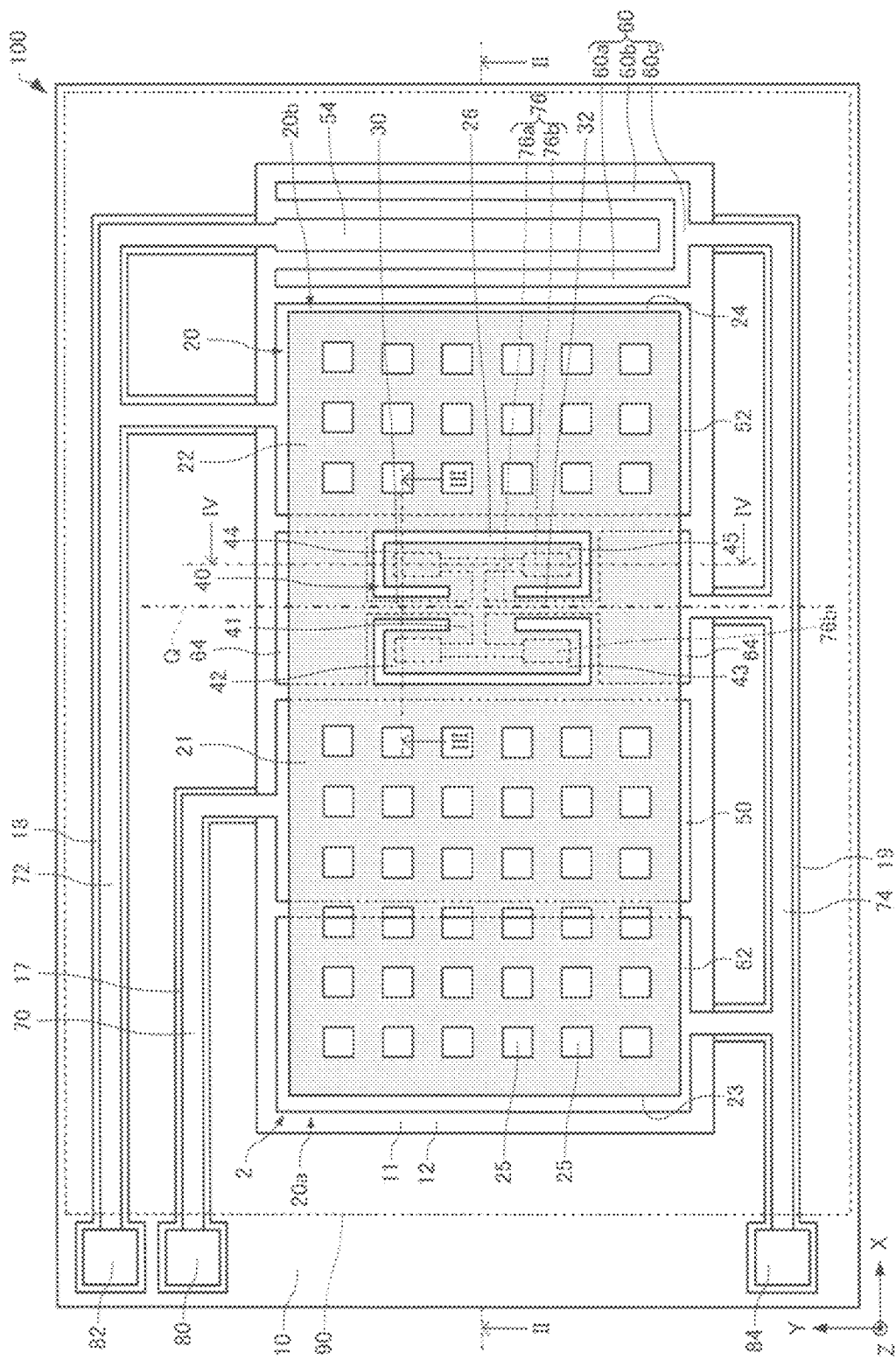
FIG. 1 is a plan view schematically showing a physical quantity sensor according to a first embodiment.
Figure 2:
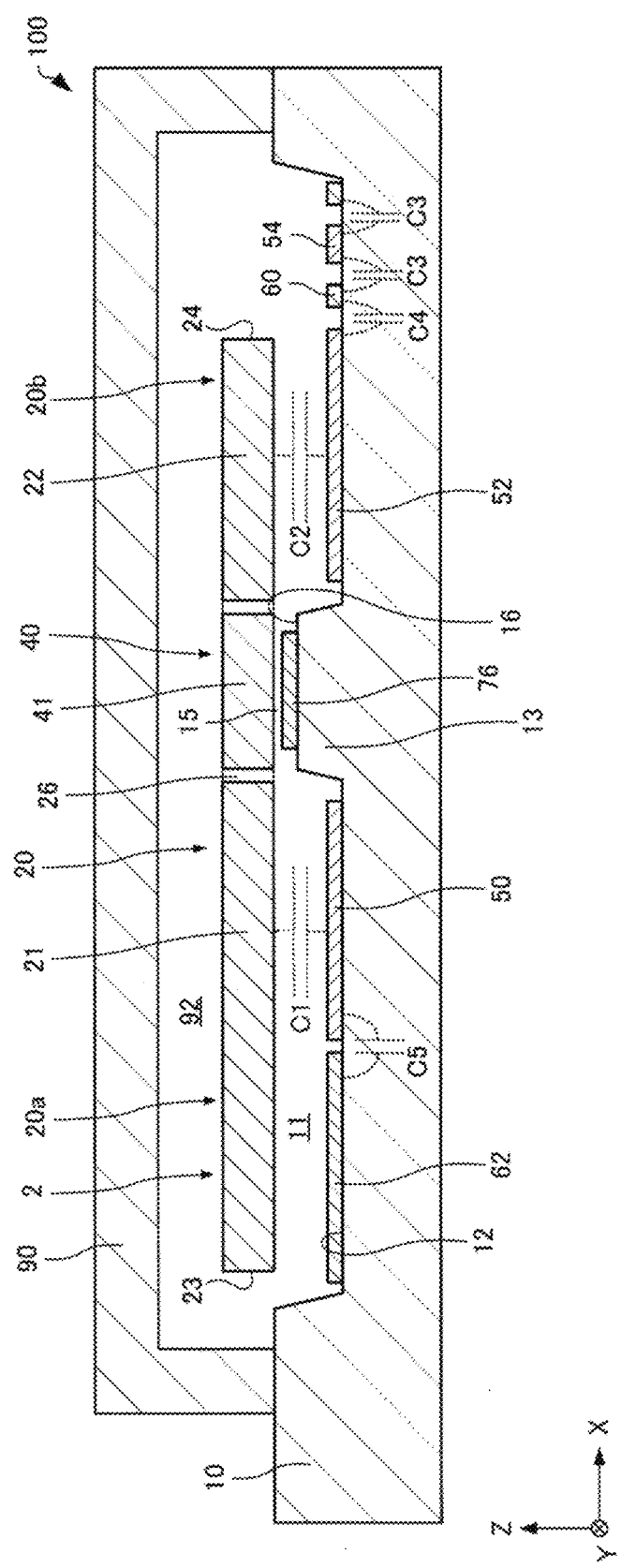
FIG. 2 is a cross-sectional view schematically showing the physical quantity sensor according to the first embodiment.
Figure 3:
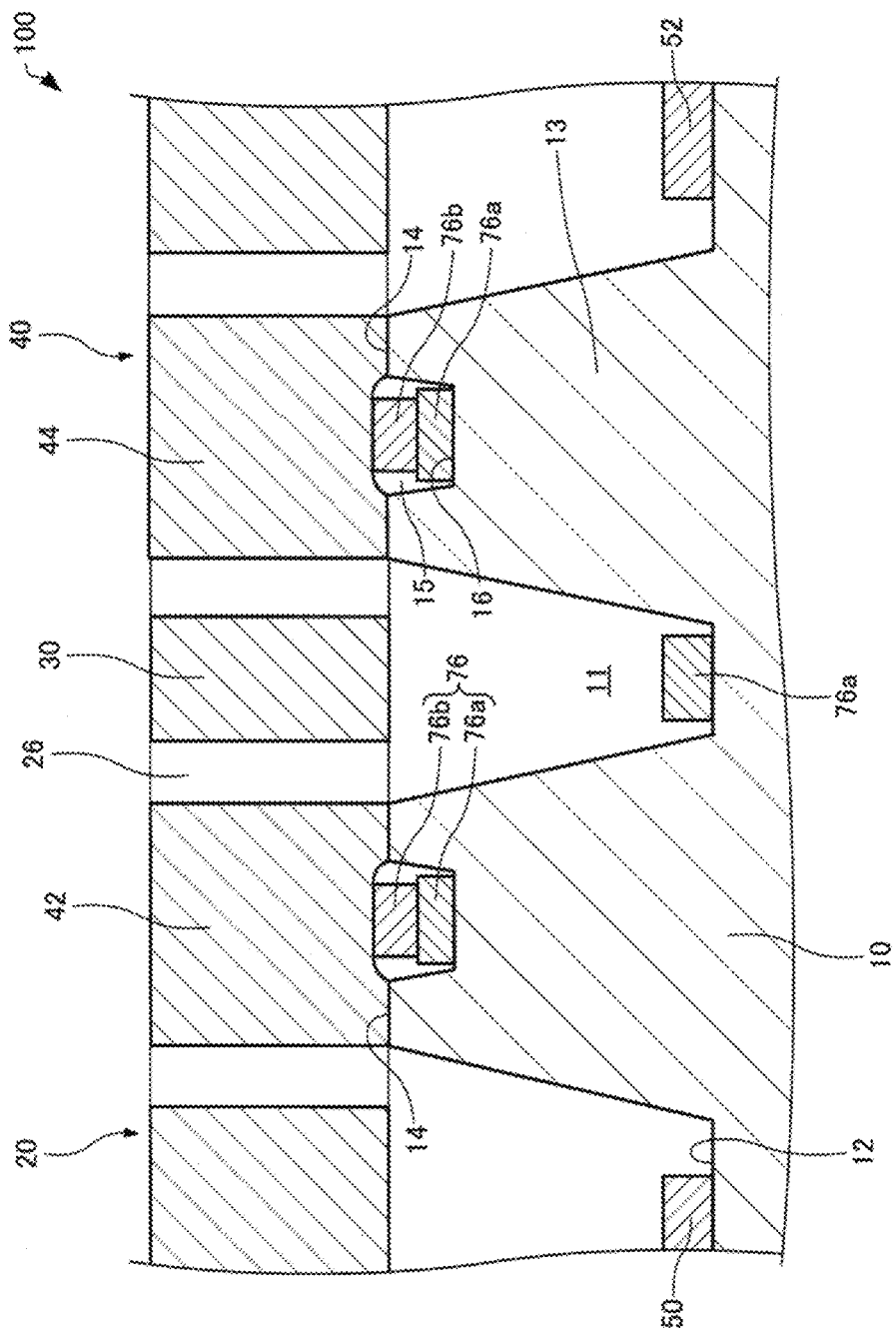
FIG. 3 is a cross-sectional view schematically showing the physical quantity sensor according to the first embodiment.
Figure 4:
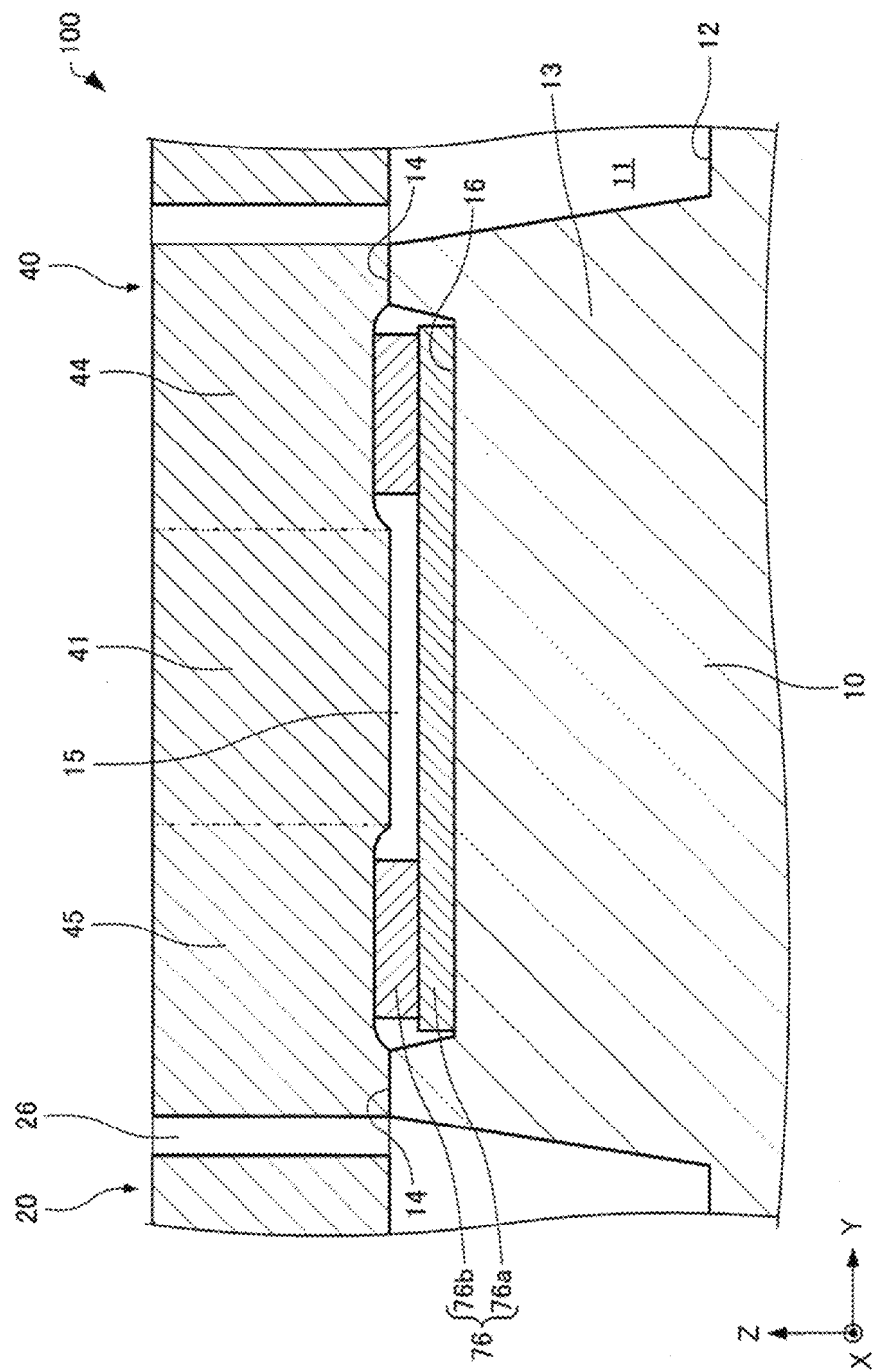
FIG. 4 is a cross-sectional view schematically showing the physical quantity sensor according to the first embodiment.

First, a physical quantity sensor according to a first embodiment will be described with reference to the drawings. FIG. 1 is a plan view schematically showing the physical quantity sensor 100 according to the first embodiment. FIG. 2 is a cross-sectional view schematically showing the physical quantity sensor 100 according to the first embodiment, taken along line II-II in FIG. 1. FIG. 3 is a cross-sectional view schematically showing the physical quantity sensor 100 according to the first embodiment, taken along line III-III in FIG. 1. FIG. 4 is a cross-sectional view schematically showing the physical quantity sensor 100 according to the first embodiment, taken along line IV-IV in FIG. 1. In FIGS. 1 to 4, the X-axis, the Y-axis, and the Z-axis are shown as three axes orthogonal to each other.

As shown in FIGS. 1 to 4, the physical quantity sensor 100 includes a substrate 10, a movable body 20 (upper capacitor plate), a first coupler 30 (torsional beam), a second coupler 32 (torsional beam), a support 40, a first fixed electrode 50, a second fixed electrode 52, a third fixed electrode 54, a first dummy electrode 60, a second dummy electrode 62, third dummy electrodes 64, a first wiring 70, a second wiring 72, a third wiring 74, a fourth wiring 76, a first pad 80, a second pad 82, a third pad 84, and a lid 90. For convenience sake, the lid 90 is shown in a see-through manner in FIG. 1. Moreover, the lid 90 is not shown in FIGS. 3 and 4.

The physical quantity sensor 100 includes: the movable body 20; the support 40 supporting the movable body 20 via the couplers 30 and 32; the substrate 10 disposed so as to overlap the movable body 20 in a plan view and provided with the first fixed electrode 50 and the second fixed electrode (lower capacitors) thereon along a first direction orthogonal to the longitudinal direction of the couplers 30 and 32; the third fixed electrode 54 not overlapping the movable body 20 in the plan view (being laterally spaced apart from an outer periphery of the movable body 20), electrically connected with any one of the first fixed electrode 50 and the second fixed electrode 52, and provided on the substrate 10; and the first dummy electrode 60 disposed next to (immediately adjacent to) the third fixed electrode 54 in the plan view, at the same potential as the movable body 20, and provided on the substrate 10.

The first dummy electrode 60 includes a first arm 60a provided on one side of the third fixed electrode 54 in the first direction, a second arm 60b provided on the other side of the third fixed electrode 54 in the first direction, and a third arm 60c (cross link) connecting the first arm 60a with the second arm 60b.

In the following, an example will be described in which the physical quantity sensor 100 is an acceleration sensor (capacitive MEMS acceleration sensor) that detects acceleration in the vertical direction (the Z-axis direction).

The material of the substrate 10 is, for example, an insulating material such as glass. For example, by forming the substrate 10 from an insulating material such as glass and forming the movable body 20 from a semiconductor material such as silicon, the substrate 10 and the movable body 20 can be easily electrically insulated from each other, and thus the sensor structure can be simplified.

A recess 11 is formed in the substrate 10. The movable body 20 and the couplers 30 and 32 are provided above the recess 11 with a gap therebetween. In the example shown in FIG. 1, the planar shape (a shape as viewed in the Z-axis direction) of the recess 11 is rectangular.

The substrate 10 includes a post 13 (pedestal support) upstanding from a bottom surface (a surface of the substrate 10 that defines the recess 11) 12 of the recess 11. The post 13 projects upward (in the +Z-axis direction) from the bottom surface 12. As shown in FIGS. 3 and 4, the height (a distance between an upper surface 14 of the post 13 and the bottom surface 12) of the post 13 and the depth of the recess 11 are, for example, equal to each other. The upper surface 14 of the post 13 is bonded to the support 40. A depression 15 is formed in the upper surface 14 of the post 13. The fourth wiring 76 is provided on a bottom surface (a surface of the post 13 that defines the depression 15) 16 of the depression 15.

The side surface (a side surface of the substrate 10 that defines the recess 11) of the recess 11 and the side surface of the post 13 are inclined relative to the bottom surface 12 of the recess 11 in the example shown in FIGS. 2 to 4, but may be vertical relative to the bottom surface 12 if desired.

The substrate 10 is provided with grooves 17, 18, and 19 in which the wirings 70, 72, and 74 are respectively disposed.

The movable body 20 is displaced about a support axis Q in response to a physical quantity (e.g., acceleration). Specifically, when acceleration in the vertical direction (the Z-axis direction) is applied, the movable body 20 rocks in a seesaw manner (reciprocally pivots) about the support axis Q, which is controlled by the couplers 30 and 32 and serves as the axis of rotation (rocking axis). The support axis Q is, for example, parallel to the Y-axis. In the example shown in FIG. 1, the planar shape of the movable body 20 is rectangular. The thickness (size in the Z-axis direction) of the movable body 20 is, for example, constant.

The movable body 20 includes a first seesaw piece (a first movable section or first movable mass/plate) 20a and a second seesaw piece (a second movable section or second movable mass) 20b. The first seesaw piece 20a is located on one side (in the illustrated example, the −X-axis direction side) of the support axis Q in a direction crossing the extending direction thereof in the plan view (as viewed in the Z-axis direction). The second seesaw piece 20b is located on the other side (in the illustrated example, the +X-axis direction side) of the support axis Q in the direction crossing the extending direction thereof in the plan view.

When acceleration (e.g., gravitational acceleration) in the vertical direction is applied to the movable body 20, a rotation moment (a moment of force) is generated in each of the first seesaw piece 20a and the second seesaw piece 20b. Here, when the rotation moment (e.g., a counterclockwise rotation moment) of the first seesaw piece 20a and the rotation moment (e.g., a clockwise rotation moment) of the second seesaw piece 20b are balanced, there is no change in the inclination of the movable body 20 relative to the substrate 10, and thus acceleration cannot be detected. Hence, the movable body 20 is designed such that when acceleration in the vertical direction is applied, the rotation moment of the first seesaw piece 20a and the rotation moment of the second seesaw piece 20b are not balanced and thus cause the movable body 20 to be inclined at a predetermined angle.

In the physical quantity sensor 100, the seesaw pieces 20a and 20b have different masses because the support axis Q is disposed at a position deviated from the center (center of gravity) of the movable body 20 (the distances from the support axis Q to the leading ends of the seesaw pieces 20a and 20b are made different). That is, the mass of the movable body 20 on one side (the first seesaw piece 20a) is different from that on the other side (the second seesaw piece 20b) with the support axis Q as the boundary therebetween. In the illustrated example, the distance from the support axis Q to an end surface 23 of the first seesaw piece 20a is greater than the distance from the support axis Q to an end surface 24 of the second seesaw piece 20b. That is, the second seesaw piece 20b is shorter in length in the direction crossing (e.g., the direction (the X-axis direction) orthogonal to) the extending direction of the support axis Q than the first seesaw piece 20a. Moreover, the thickness of the first seesaw piece 20a and the thickness of the second seesaw piece 20b are equal to each other. Hence, the mass of the first seesaw piece 20a is greater than the mass of the second seesaw piece 20b.

As described above, since the seesaw pieces 20a and 20b have different masses, the rotation moment of the first seesaw piece 20a and the rotation moment of the second seesaw piece 20b can be unbalanced when the acceleration in the vertical direction is applied. Hence, when the acceleration in the vertical direction is applied, the movable body 20 can be inclined at a predetermined angle.

Although not illustrated, the seesaw pieces 20a and 20b may be configured to have different masses by disposing the support axis Q at the center of the movable body 20 and making the thicknesses of the seesaw pieces 20a and 20b different from each other. Also in this case, when the acceleration in the vertical direction is applied, the movable body 20 can be inclined at a predetermined angle.

The movable body 20 is spaced apart from the substrate 10. The movable body 20 is provided above the recess 11. A gap is provided between the movable body 20 and the substrate 10. The movable body 20 is spaced apart from the support 40 via the couplers 30 and 32. With this configuration, the movable body 20 can rock in a seesaw manner.

The movable body 20 includes a first movable electrode 21 and a second movable electrode 22, which are separated with the support axis Q serving as the boundary. The first movable electrode 21 is provided in the first seesaw piece 20a. The second movable electrode 22 is provided in the second seesaw piece 20b.

The first movable electrode 21 is a portion of the movable body 20 that overlaps the first fixed electrode 50 in the plan view. The first movable electrode 21 forms a capacitance C1 with the first fixed electrode 50. That is, the capacitance C1 is formed by the first movable electrode 21 and the first fixed electrode 50.

The second movable electrode 22 is a portion of the movable body 20 that overlaps the second fixed electrode 52 in the plan view. The second movable electrode 22 forms a capacitance C2 with the second fixed electrode 52. That is, the capacitance C2 is formed by the second movable electrode 22 and the second fixed electrode 52. In the physical quantity sensor 100, the movable body 20 is made of a conductive material (impurity-doped silicon) so that the movable electrodes 21 and 22 are provided. That is, the first seesaw piece 20a functions as a host for the first movable electrode 21, and the second seesaw piece 20b functions as a host for the second movable electrode 22.

The capacitance C1 and the capacitance C2 are configured so as to be, for example, equal to each other in the state where the movable body 20 shown in FIG. 2 is in a horizontal position (e.g., parallel to the substrate 10). The positions of the movable electrodes 21 and 22 change in response to the movement of the movable body 20. In response to the positions of the movable electrodes 21 and 22, the capacitances C1 and C2 change. A predetermined potential is applied to the movable body 20 through the couplers 30 and 32 and the support 40.

Through-holes 25 penetrating the movable body 20 are formed in the movable body 20. With this configuration, the influence of air (air resistance) during rocking of the movable body 20 can be reduced. More than one through-hole 25 is formed. In the illustrated example, the planar shape of the through-hole 25 is square.

The movable body 20 is provided with an opening 26 penetrating the movable body 20. The opening 26, if considered in a broad sense, is provided to span across the support axis Q in the plan view, with the couplers 30 and 32 and the support 40 provided within the opening 26. In the illustrated example, the overall planar shape of the opening 26 is rectangular. In more detail, the opening 26 includes two slots that are respectively C-shaped and backwards C-shaped and the two slots are provided as mirror images on either side of the support axis Q. The movable body 20 is connected with the support 40 via the couplers 30 and 32.

The first coupler 30 and the second coupler 32 couple the movable body 20 to the support 40. The couplers 30 and 32 function as torsion springs. With this configuration, the couplers 30 and 32 can have strong resilience against torsion deformation while the movable body 20 is rocking in a seesaw manner.

The first coupler 30 and the second coupler 32 are disposed on the support axis Q in the plan view. The couplers 30 and 32 extend along the support axis Q. The first coupler 30 extends in the +Y-axis direction from the support 40. The second coupler 32 extends in the −Y-axis direction from the support 40.

The support 40 is disposed in the opening 26. The support 40 is provided on the support axis Q in the plan view. A portion of the support 40 is bonded (connected) to the upper surface 14 of the post 13. The support 40 supports the movable body 20 via the couplers 30 and 32.

The support 40 includes a first extension 41 (wing), a second extension 42 (tabular plate), a third extension 43 (first tabular plate), a fourth extension 44 (first tabular plate), and a fifth extension 45 (first tabular plate). The first extension 41 extends in the X-axis direction. The first extension 41 is connected with the couplers 30 and 32. The second extension 42 and the third extension 43 extend in opposite directions along the Y-axis from one end (specifically, an end in the −X-axis direction) of the first extension 41. The fourth extension 44 and the fifth extension 45 extend in opposite directions along the Y-axis from the other end (specifically, an end in the +X-axis direction) of the first extension 41. The first extension 41 is spaced apart from the substrate 10. A portion of each of the extensions 42, 43, 44, and 45 is bonded to the post 13.

The support 40 includes the extensions 41, 42, 43, 44, and 45 described above, and thus has an H-shaped (substantially H-shaped) planar shape. The first extension constitutes the horizontal bar of the H-shape. The extensions 42, 43, 44, and 45 constitute the vertical bars of the H-shape.

The movable body 20, the couplers 30 and 32, and the support 40 are integrally provided as a monolithic structure. In the illustrated example, the movable body 20, the couplers 30 and 32, and the support 40 constitute one structure 2. The material of the movable body 20, the couplers 30 and 32, and the support 40 is, for example, silicon doped with an impurity such as phosphorus or boron to provide conductivity. When the material of the substrate 10 is glass and the material of the movable body 20, the couplers 30 and 32, and the support 40 is silicon, the substrate 10 and the support 40 are bonded together by, for example, anodic bonding.

In the physical quantity sensor 100, the structure 2 is fixed to the substrate 10 with one support 40. That is, the structure 2 is fixed at one point (one support 40) to the substrate 10. Hence, in the physical quantity sensor 100, it is possible to reduce the influence of stress caused by a difference between the thermal expansion rate of the substrate 10 and the thermal expansion rate of the structure 2, stress applied to a device at the time of mounting, or the like on the couplers 30 and 32, compared to, for example, the case where the structure 2 is fixed at two points (two supports) to the substrate 10.

The first fixed electrode 50, the second fixed electrode 52, and the third fixed electrode 54 are fixed to the substrate 10. The fixed electrodes 50, 52, and 54 are provided on the substrate 10. In the illustrated example, the fixed electrodes 50, 52, and 54 are provided on the bottom surface 12 of the recess 11. The material of the fixed electrodes 50, 52, and 54 is, for example, platinum, titanium tungsten, aluminum, gold, indium tin oxide (ITO), or the like.

The first fixed electrode 50 is provided on one side (in the illustrated example, the −X-axis direction side) of the support axis Q in the direction crossing the extending direction thereof in the plan view. The first fixed electrode 50 overlaps the first seesaw piece 20a in the plan view. The first fixed electrode 50 is disposed to face the first movable electrode 21. The first fixed electrode 50 has, for example, a rectangular shape in the plan view.

The second fixed electrode 52 is provided on the other side (in the illustrated example, the +X-axis direction side) of the support axis Q in the direction crossing the extending direction thereof in the plan view. The second fixed electrode 52 overlaps the second seesaw piece 20b in the plan view. The second fixed electrode 52 is disposed to face the second movable electrode 22. The second fixed electrode 52 has, for example, a rectangular shape in the plan view. The second fixed electrode 52 is provided between the first fixed electrode 50 and the third fixed electrode 54. In the plan view, the area of a portion of the first fixed electrode 50 that overlaps the movable body 20 and the area of a portion of the second fixed electrode 52 that overlaps the movable body 20 are, for example, equal to each other.

The third fixed electrode 54 is provided on the other side (in the illustrated example, the +X-axis direction side) of the support axis Q in the direction crossing the extending direction thereof in the plan view. The third fixed electrode 54 does not overlap the movable body 20 in the plan view. That is, the third fixed electrode 54 is provided outside the peripheral edge of the movable body 20 in the plan view. The third fixed electrode 54 is electrically connected with the first fixed electrode 50 or the second fixed electrode 52. In the illustrated example, the third fixed electrode 54 is electrically connected with the second fixed electrode 52 through the second wiring 72.

The third fixed electrode 54 is longitudinally extended along the extending direction (in the illustrated example, the Y-axis direction) of the support axis Q in the plan view. The third fixed electrode 54 has, for example, a rectangular shape in the plan view.

The first dummy electrode 60, the second dummy electrode 62, and the third dummy electrodes 64 are fixed to the substrate 10. The dummy electrodes 60, 62, and 64 are provided on the substrate 10. In the illustrated example, the dummy electrodes 60, 62, and 64 are provided on the bottom surface 12 of the recess 11. The dummy electrodes 60, 62, and 64 are electrically connected with the movable body 20. The dummy electrodes 60, 62, and 64 have, for example, the same potential as the movable body 20. The material of the dummy electrodes 60, 62, and 64 is, for example, the same as the material of the fixed electrodes 50, 52, and 54.

The first dummy electrode 60 is provided on the other side (in the illustrated example, the +X-axis direction side) of the support axis Q in the direction crossing the extending direction thereof in the plan view. In the illustrated example, the first dummy electrode 60 is provided on the +X-axis direction side of the second fixed electrode 52. For example, the first dummy electrode 60 does not overlap the movable body 20 in the plan view. Although not illustrated, the first dummy electrode 60 may overlap the movable body 20 in the plan view.

The first dummy electrode 60 is provided next to the third fixed electrode 54. That is, the other electrodes 50, 52, 62, and 64 are not present between the first dummy electrode 60 and the third fixed electrode 54. In the illustrated example, the first dummy electrode 60 is electrically connected with the movable body 20 through the third wiring 74, the third dummy electrode 64, the fourth wiring 76, the support 40, and the couplers 30 and 32.

The first dummy electrode 60 includes the first arm 60a, the second arm 60b, and the third arm 60c.

The first arm 60a of the first dummy electrode 60 is provided on one side (in the illustrated example, the −X-axis direction side) of the third fixed electrode 54 in the direction crossing (e.g., the direction orthogonal to) the extending direction of the support axis Q. The first arm 60a is longitudinally extended in the Y-axis direction in the plan view, and has a rectangular shape in the illustrated example. The first arm 60a is provided between the second fixed electrode 52 and the third fixed electrode 54.

The second arm 60b of the first dummy electrode 60 is provided on the other side (in the illustrated example, the +X-axis direction side) of the third fixed electrode 54 in the direction crossing (e.g., the direction orthogonal to) the extending direction of the support axis Q. The second arm 60b is longitudinally extended in the Y-axis direction in the plan view, and has a rectangular shape in the illustrated example.

The third arm 60c of the first dummy electrode 60 is provided on one side (in the illustrated example, the −Y-axis direction side) of the third fixed electrode 54 in the extending direction of the support axis Q. The third arm 60c is longitudinally extended in the X-axis direction in the plan view, and has a rectangular shape in the illustrated example. The third arm 60c is a cross link that connects the first arm 60a with the second arm 60b. The first dummy electrode 60 has a U-like (substantially U-like) shape in the plan view.

The first dummy electrode 60 forms a capacitance C3 with the third fixed electrode 54. That is, the capacitance C3 is formed by the third fixed electrode 54 and the first dummy electrode 60. Further, the first dummy electrode 60 forms a capacitance C4 with the second fixed electrode 52. That is, the capacitance C4 is formed by the second fixed electrode 52 and the first dummy electrode 60.

The second dummy electrode 62 is provided on the one side (in the illustrated example, the −X-axis direction side) of the support axis Q in the direction crossing the extending direction thereof in the plan view. In the illustrated example, the second dummy electrode 62 is provided on the −X-axis direction side of the first fixed electrode 50. The second dummy electrode 62 overlaps the movable body 20. In the illustrated example, the second dummy electrode 62 is electrically connected with the movable body 20 through the third wiring 74, the third dummy electrode 64, the fourth wiring 76, the support 40, and the couplers 30 and 32. The second dummy electrode 62 has, for example, a rectangular shape in the plan view.

The second dummy electrode 62 forms a capacitance C5 with the first fixed electrode 50. That is, the capacitance C5 is formed by the first fixed electrode 50 and the second dummy electrode 62.

The third dummy electrodes 64 are provided between the first fixed electrode 50 and the second fixed electrode 52. The third dummy electrodes 64 overlap the movable body 20 in the plan view. In the illustrated example, two of the third dummy electrodes 64 are provided. In the plan view, one of the third dummy electrodes 64 is provided on the +Y-axis direction side of the support 40, and the other third dummy electrode 64 is provided on the −Y-axis direction side of the support 40. The two third dummy electrodes 64 are connected by the fourth wiring 76. In the illustrated example, the third dummy electrodes 64 are electrically connected with the movable body 20 through the fourth wiring 76, the support 40, and the couplers 30 and 32. The third dummy electrode 64 has, for example, a rectangular shape in the plan view.

The third dummy electrode 64 forms a capacitance C6 (not shown) with the first fixed electrode 50. That is, the capacitance C6 is formed by the first fixed electrode 50 and the third dummy electrode 64. Further, the third dummy electrode 64 forms a capacitance C7 (not shown) with the second fixed electrode 52. That is, the capacitance C7 is formed by the second fixed electrode 52 and the third dummy electrode 64.

The first wiring 70 is provided on the substrate 10. The first wiring 70 connects the first pad 80 with the first fixed electrode 50. In the illustrated example, the first wiring 70 extends from the first pad 80 through the first groove 17 and the recess 11 to the first fixed electrode 50.

The second wiring 72 is provided on the substrate 10. The second wiring 72 connects the second pad 82 with the fixed electrodes 52 and 54. In the illustrated example, the second wiring 72 extends from the second pad 82 through the second groove 18, and branches into two wirings, which then extend respectively to the fixed electrodes 52 and 54 through the recess 11.

The third wiring 74 is provided on the substrate 10. The third wiring 74 connects the third pad 84 with the dummy electrodes 60, 62, and 64. In the illustrated example, the third wiring 74 extends from the third pad 84 through the third groove 19, and branches into three wirings, which then extend respectively to the dummy electrodes 60, 62, and 64 through the recess 11. The material of the wirings 70, 72, and 74 is, for example, the same as the material of the fixed electrodes 50, 52, and 54.

The fourth wiring 76 is provided on the substrate 10. The fourth wiring 76 includes a wiring layer 76a and bumps 76b.

The wiring layer 76a of the fourth wiring 76 connects the two third dummy electrodes 64 together. Further, the wiring layer 76a extends from the third dummy electrodes 64 through the depression 15 to the bumps 76b. A portion of the wiring layer 76a that is provided in the depression 15 overlaps the support 40 in the plan view. In the illustrated example, the planar shape of the portion of the wiring layer 76a provided in the depression 15 is an H-shape (substantially H-shape). The material of the wiring layer 76a is, for example, the same as the material of the fixed electrodes 50, 52, and 54.

The bumps 76b of the fourth wiring 76 are provided on the wiring layer 76a. The bump 76b connects the wiring layer 76a with the support 40. In the illustrated example, four bumps 76b are provided. The bumps 76b are connected to the extensions 42, 43, 44, and 45. The material of the bump 76b is, for example, aluminum, gold, or platinum.

The lid 90 is provided on the substrate 10. The lid 90 is bonded to the substrate 10. The lid 90 and the substrate 10 form a cavity 92 in which the movable body 20 is accommodated. For example, an inert gas (e.g., a nitrogen gas) atmosphere is established in the cavity 92. The material of the lid 90 is, for example, silicon. When the material of the lid 90 is silicon and the material of the substrate 10 is glass, the substrate 10 and the lid 90 are bonded together by, for example, anodic bonding.

Next, the operation of the physical quantity sensor 100 will be described.

In the physical quantity sensor 100, the movable body 20 rocks (pivots) about the support axis Q in response to a physical quantity such as acceleration or angular velocity. With the movement of the movable body 20, the distance between the first movable electrode 21 and the first fixed electrode 50 and the distance between the second movable electrode 22 and the second fixed electrode 52 change. Specifically, when, for example, acceleration in the vertically upward direction (the +Z-axis direction) is applied to the physical quantity sensor 100, the movable body 20 rotates counterclockwise, which reduces the distance between the first movable electrode 21 and the first fixed electrode 50 and increases the distance between the second movable electrode 22 and the second fixed electrode 52. As a result of this, the capacitance C1 increases while the capacitance C2 decreases. When, for example, acceleration in the vertically downward direction (the −Z-axis direction) is applied to the physical quantity sensor 100, the movable body 20 rotates clockwise, which increases the distance between the first movable electrode 21 and the first fixed electrode 50 and reduces the distance between the second movable electrode 22 and the second fixed electrode 52. As a result of this, the capacitance C1 decreases while the capacitance C2 increases.

In the physical quantity sensor 100, the sum (a first capacitance) of the capacitance C1, the capacitance C5, and the capacitance C6 is detected using the pads 80 and 84. Further, in the physical quantity sensor 100, the sum (a second capacitance) of the capacitance C2, the capacitance C3, the capacitance C4, and the capacitance C7 is detected using the pads 82 and 84. Then, based on a difference between the first capacitance and the second capacitance (by a so-called differential detection method), a physical quantity such as the orientation or magnitude of acceleration or angular velocity can be detected.

As described above, the physical quantity sensor 100 can be used as an inertial sensor such as an acceleration sensor or a gyro sensor. Specifically, the physical quantity sensor 100 can be used as, for example, a capacitive acceleration sensor for measuring acceleration in the vertical direction (the Z-axis direction).

The physical quantity sensor 100 has, for example, the following features.

The physical quantity sensor 100 includes the third fixed electrode 54 fixed to the substrate 10, not overlapping the movable body 20 in the plan view, and electrically connected with the second fixed electrode 52, and the first dummy electrode 60 fixed to the substrate 10, provided next to the third fixed electrode 54, and at the same potential as the movable body 20. For example, in the physical quantity sensor 100, if the third fixed electrode 54 is not provided, the first capacitance detected by the pads 80 and 84 is greater than the second capacitance detected by the pads 82 and 84 in the state where acceleration is not applied. In the physical quantity sensor 100, by providing the third fixed electrode 54 electrically connected with the second fixed electrode 52, the capacitance C3 can be formed by the third fixed electrode 54 and the first dummy electrode 60, and therefore, the second capacitance can be increased. Therefore, in the physical quantity sensor 100, a capacitance offset (a difference between the first capacitance and the second capacitance) can be reduced. For example, in the physical quantity sensor 100, the capacitance offset can be reduced to such an extent that can be adjusted by an integrated circuit (IC) that is electrically connected to the physical quantity sensor 100, so that yield can be improved.

For example, first, a physical quantity sensor not provided with the third fixed electrode 54 is manufactured. Next, a capacitance offset of the physical quantity sensor is measured in the state where acceleration is not applied. Then, when the first capacitance is greater than the second capacitance, the third fixed electrode 54 is provided to manufacture the physical quantity sensor 100 in which the capacitance offset is reduced. The capacitance offset of the physical quantity sensor not provided with the third fixed electrode 54 may be obtained by actually manufacturing the physical quantity sensor not provided with the third fixed electrode 54 and then measuring the capacitance offset as described above, or the capacitance offset may be obtained by simulations.

Further, in the physical quantity sensor 100, the third fixed electrode 54 does not overlap the movable body 20 in the plan view, and therefore, it is possible to prevent the formation of a capacitance by the movable body 20 and the third fixed electrode 54. Therefore, in the physical quantity sensor 100, the capacitance offset between the first capacitance and the second capacitance can be easily adjusted using the third fixed electrode 54 also in, for example, the state where the movable body 20 is displaced.

In the physical quantity sensor 100, the third fixed electrode 54 is longitudinally extended along the Y-axis direction in the plan view, and the first dummy electrode 60 includes the first arm 60a provided on the −X-axis direction side of the third fixed electrode 54, the second arm 60b provided on the +X-axis direction side of the third fixed electrode 54, and the third arm 60c provided on the −Y-axis direction side of the third fixed electrode 54 and connecting the first arm 60a with the second arm 60b. Therefore, in the physical quantity sensor 100, the capacitance C3 formed by the third fixed electrode 54 and the first dummy electrode 60 can be increased compared to, for example, the case where the first dummy electrode 60 only includes the first arm 60a. Further, the first dummy electrode 60 is not provided on the +Y-axis direction side of the third fixed electrode 54, and therefore, it is possible to facilitate the connection between the third fixed electrode 54 and the second wiring 72 (facilitate the routing of the second wiring 72 to the third fixed electrode 54).

In the physical quantity sensor 100, the movable body 20 includes the first seesaw piece 20a located on the −X-axis direction side of the support axis Q, and the second seesaw piece 20b located on the +X-axis direction side of the support axis Q which is shorter in length in the Y-axis direction than the first seesaw piece 20a. The first fixed electrode 50 overlaps the first seesaw piece 20a in the plan view, and the second fixed electrode 52 overlaps the second seesaw piece 20b in the plan view. Therefore, in the physical quantity sensor 100, when acceleration in the vertical direction is applied, the rotation moment of the first seesaw piece 20a and the rotation moment of the second seesaw piece 20b can be unbalanced. Hence, in the physical quantity sensor 100, when the acceleration in the vertical direction is applied, the movable body 20 can be inclined at a predetermined angle.

The physical quantity sensor 100 includes the second dummy electrode 62 fixed to the substrate 10, overlapping the first seesaw piece 20a in the plan view, and electrically connected with the movable body 20. Therefore, in the physical quantity sensor 100, the movable body 20 can be prevented from sticking to the substrate 10. Specifically, in the case where the material of the substrate 10 is glass and the material of the movable body 20 and the lid 90 is silicon, even when the substrate 10 and the lid 90 are anodically bonded together, it is possible to prevent the movable body 20 from sticking to the substrate 10 due to an electrostatic force occurring between the substrate 10 and the movable body 20.

In the physical quantity sensor 100, the third fixed electrode 54 is provided on the +X-axis direction side of the support axis Q in the plan view; the second fixed electrode 52 is provided between the first fixed electrode 50 and the third fixed electrode 54; and the first dummy electrode 60 is provided between the second fixed electrode 52 and the third fixed electrode 54. Therefore, in the physical quantity sensor 100, the capacitance C4 can be formed by the second fixed electrode 52 and the first dummy electrode 60.

The physical quantity sensor 100 includes the third dummy electrode 64 fixed to the substrate 10, overlapping the movable body 20 in the plan view, and at the same potential as the movable body 20. The third dummy electrode 64 is provided between the first fixed electrode 50 and the second fixed electrode 52. Therefore, in the physical quantity sensor 100, sticking can be prevented more reliably.

In the above, an example has been described in which the dummy electrodes 60, 62, and 64 are electrically connected with the movable body 20; however, the dummy electrodes 60, 62, and 64 may not be electrically connected with the movable body 20 when the dummy electrodes 60, 62, and 64 can have the same potential as the movable body 20. The meaning of the "same potential" includes, in addition to the case where the voltages are the same as each other, for example the case where there are inevitable fluctuations in voltage (e.g., a fluctuation of approximately ±5%).

The shapes of the third fixed electrode 54 and the first dummy electrode 60 and the distance therebetween can be appropriately designed in response to the capacitance offset.

Figure 5:
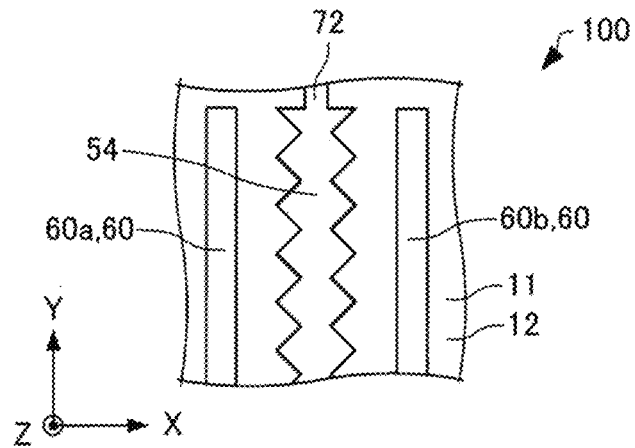
FIG. 5 is a plan view schematically showing the physical quantity sensor according to the first embodiment.
Figure 6:
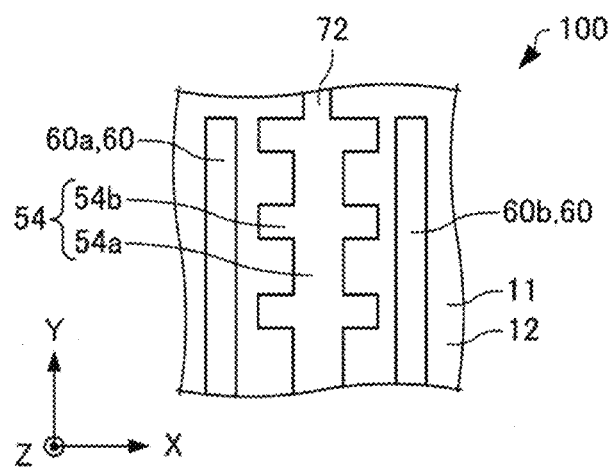
FIG. 6 is a plan view schematically showing the physical quantity sensor according to the first embodiment.

For example, the planar shape of the third fixed electrode 54 is rectangular in the above; however, the planar shape of the third fixed electrode 54 may be a saw shape having a longitudinal direction in the Y-axis direction and having teeth projecting in the X-axis direction as shown in FIG. 5. Alternatively, as shown in FIG. 6, the third fixed electrode 54 may have a shape including an extension 54*a* (rail or bridge) extending in the Y-axis direction and extensions 54*b* (tables) extending in the X-axis direction from the extension 54*a*. The third fixed electrode 54 having the shape described above can increase the capacitance C3 formed with the first dummy electrode 60, compared to, for example, the case where the planar shape is rectangular.

Although not illustrated, an adhesion layer for improving adhesion may be provided between the substrate 10 and the fixed electrodes 50, 52, and 54, between the substrate 10 and the dummy electrodes 60, 62, and 64, and between the substrate 10 and the wirings 70, 72, and 74. The adhesion layer may be a Ti layer.

Although the physical quantity sensor 100 has been described as being an acceleration sensor in the above, a physical quantity sensor according to the invention may also be, for example, a gyro sensor.

1.2. Method of Manufacturing Physical Quantity Sensor

Figure 7:
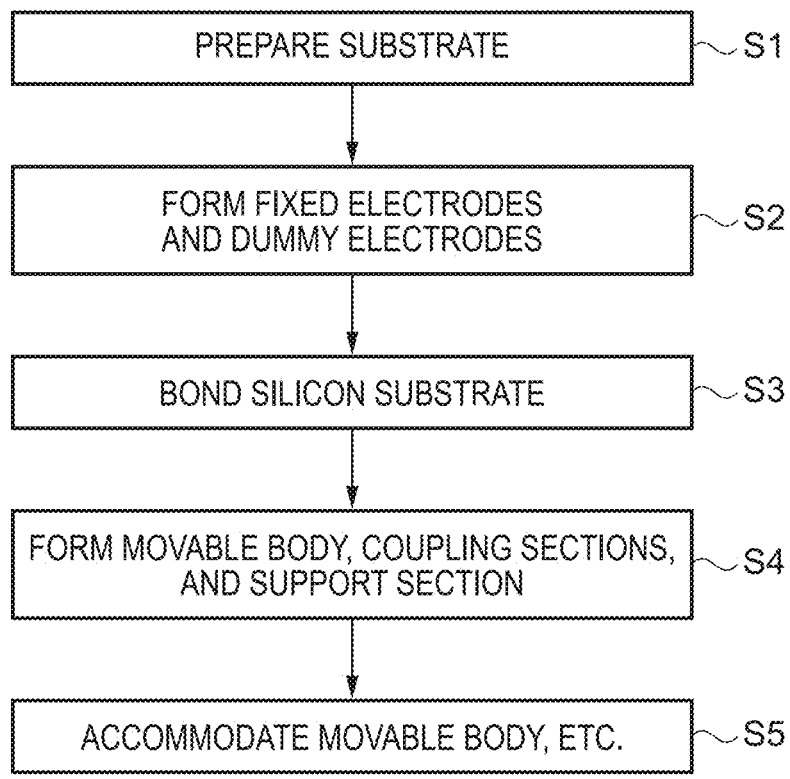
FIG. 7 is a flowchart for explaining a method of manufacturing the physical quantity sensor according to the first embodiment.
Figure 8:
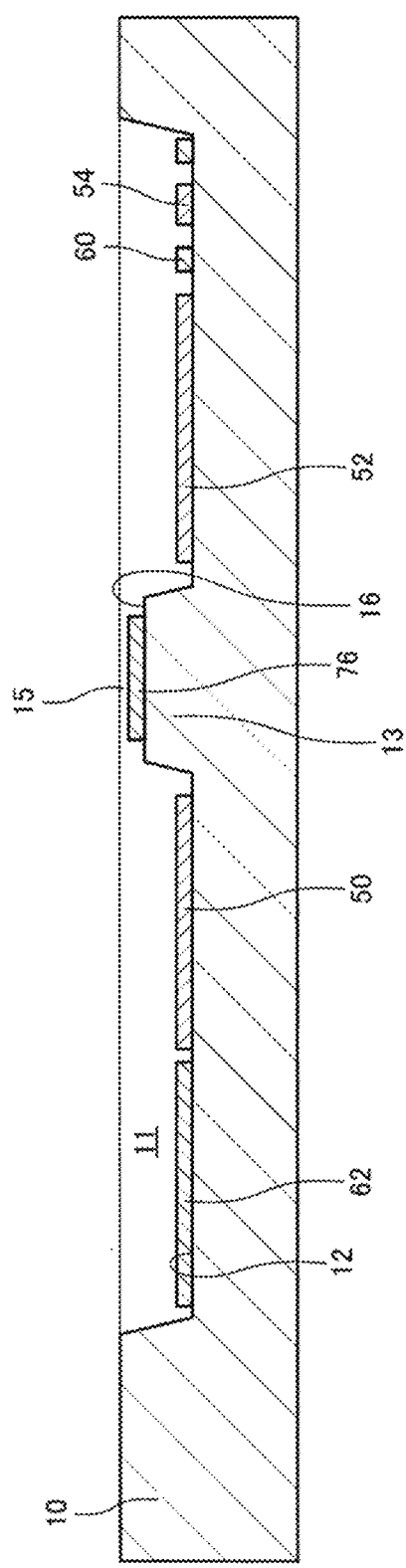
FIG. 8 is a cross-sectional view schematically showing a manufacturing process of the physical quantity sensor according to the first embodiment.
Figure 9:
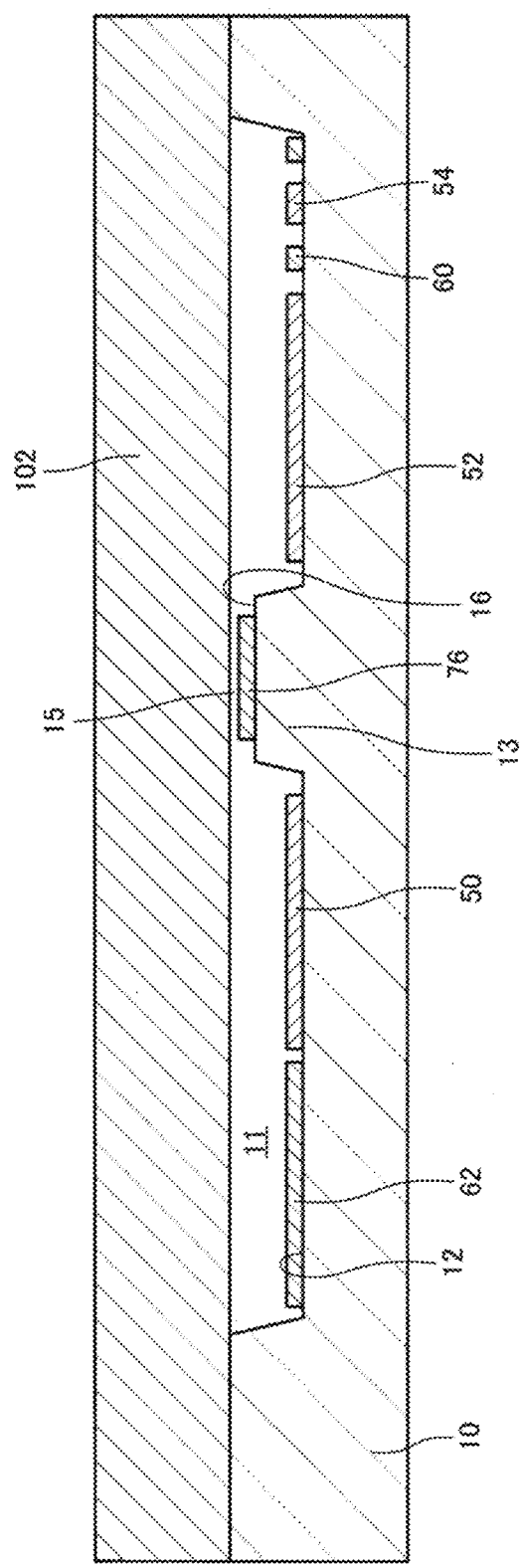
FIG. 9 is a cross-sectional view schematically showing a manufacturing process of the physical quantity sensor according to the first embodiment.
Figure 10:
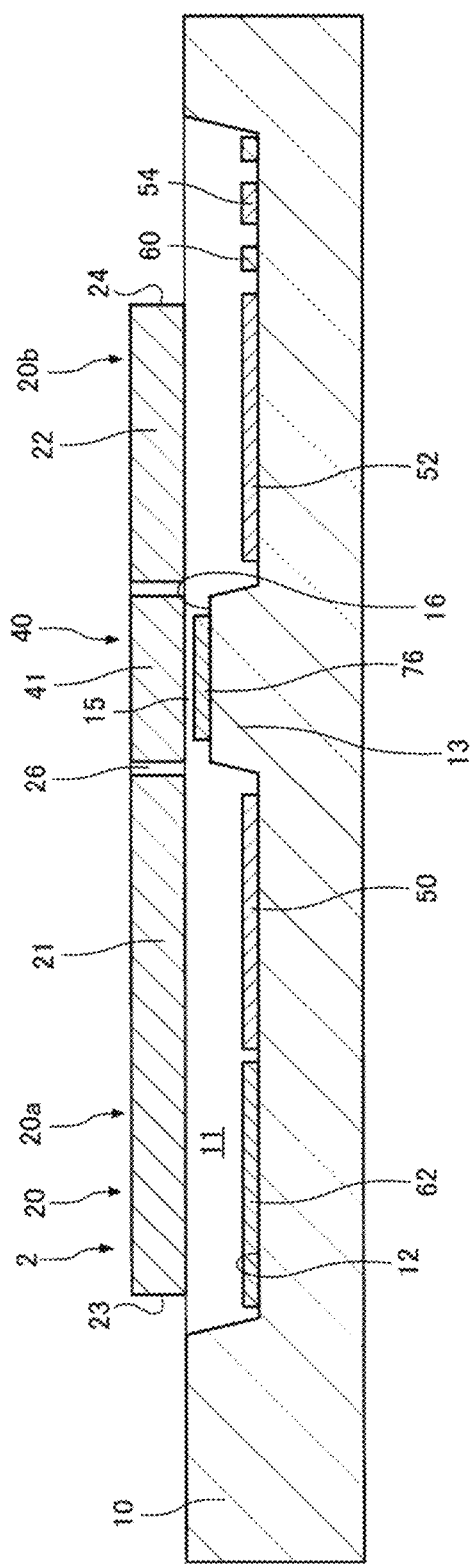
FIG. 10 is a cross-sectional view schematically showing a manufacturing process of the physical quantity sensor according to the first embodiment.

Next, a method of manufacturing the physical quantity sensor 100 according to the first embodiment will be described with reference to the drawings. FIG. 7 is a flowchart for explaining the method of manufacturing the physical quantity sensor 100 according to the first embodiment. FIGS. 8 to 10 are cross-sectional views schematically showing manufacturing processes of the physical quantity sensor 100 according to the first embodiment.

As shown in FIG. 8, for example, a glass substrate is patterned to prepare the substrate 10 provided with the recess 11, the post 13 in which the depression 15 is formed, and the grooves 17, 18, and 19 (see FIG. 1) (Step S1). The patterning is performed by, for example, photolithography and etching.

Next, the fixed electrodes 50, 52, and 54 and the dummy electrodes 60, 62, and 64 are formed on the bottom surface 12 of the recess 11 (Step S2). Next, the wirings 70, 72, and 74 and the wiring layer 76*a* are formed on the substrate 10 (see FIG. 1). Next, the bump 76*b* is formed on the wiring layer 76*a* (see FIGS. 3 and 4). With this configuration, the fourth wiring 76 can be formed. The upper surface of the bump 76*b* is formed so as to be located higher than the upper surface 14 of the post 13. Next, the pads 80, 82, and 84 are formed so as to be respectively connected with the wirings 70, 72, and 74 (see FIG. 1). The wirings 70, 72, and 74 and the wiring layer 76*a* may be formed in the same process as the fixed electrodes 50, 52, and 54 and the dummy electrodes 60, 62, and 64.

The fixed electrodes 50, 52, and 54, the dummy electrodes 60, 62, and 64, the wirings 70, 72, 74, and 76, and the pads 80, 82, and 84 are formed by, for example, deposition by a sputtering method or a chemical vapor deposition (CVD) method and patterning. The patterning is performed by, for example, photolithography and etching.

As shown in FIG. 9, for example, a silicon substrate 102 is bonded to the substrate 10 (Step S3). The bonding of the substrate 10 and the silicon substrate 102 is performed by, for example, anodic bonding. With this configuration, the substrate 10 and the silicon substrate 102 can be firmly bonded together. In bonding the silicon substrate 102 to the substrate 10, the silicon substrate 102 is pressed by, for example, the bump 76*b* of the fourth wiring 76 and thus depressed (see FIGS. 3 and 4). With this configuration, the silicon substrate 102 and the bump 76*b* can be firmly connected together.

As shown in FIG. 10, the silicon substrate 102 is ground by, for example, a grinding machine to be a thin film and then patterned into a predetermined shape, so that the movable body 20, the couplers 30 and 32, and the support 40 are integrally formed (Step S4). The patterning is performed by photolithography and etching (dry etching), and as a more specific etching technique, a Bosch process can be used.

As shown in FIG. 2, the lid 90 is bonded to the substrate 10 to accommodate the movable body 20 and the like in the cavity 92 formed by the substrate 10 and the lid 90 (Step S5). The bonding of the substrate 10 and the lid 90 is performed by, for example, anodic bonding. With this configuration, the substrate 10 and the lid 90 can be firmly bonded together. The cavity 92 can be filled with an inert gas by performing this process in an inert gas atmosphere.

Through the processes described above, the physical quantity sensor 100 can be manufactured.

For example, if the first capacitance detected by the pads 80 and 84 is smaller than the second capacitance detected by the pads 82 and 84 when capacitances are detected by the pads 80, 82, and 84, a portion of at least one of the fixed electrode 54 and the first dummy electrode 60 may be removed by a laser or the like to reduce the second capacitance. With this configuration, the capacitance offset can be more reduced. The first capacitance and the second capacitance may be obtained by simulations.

Figure 11:
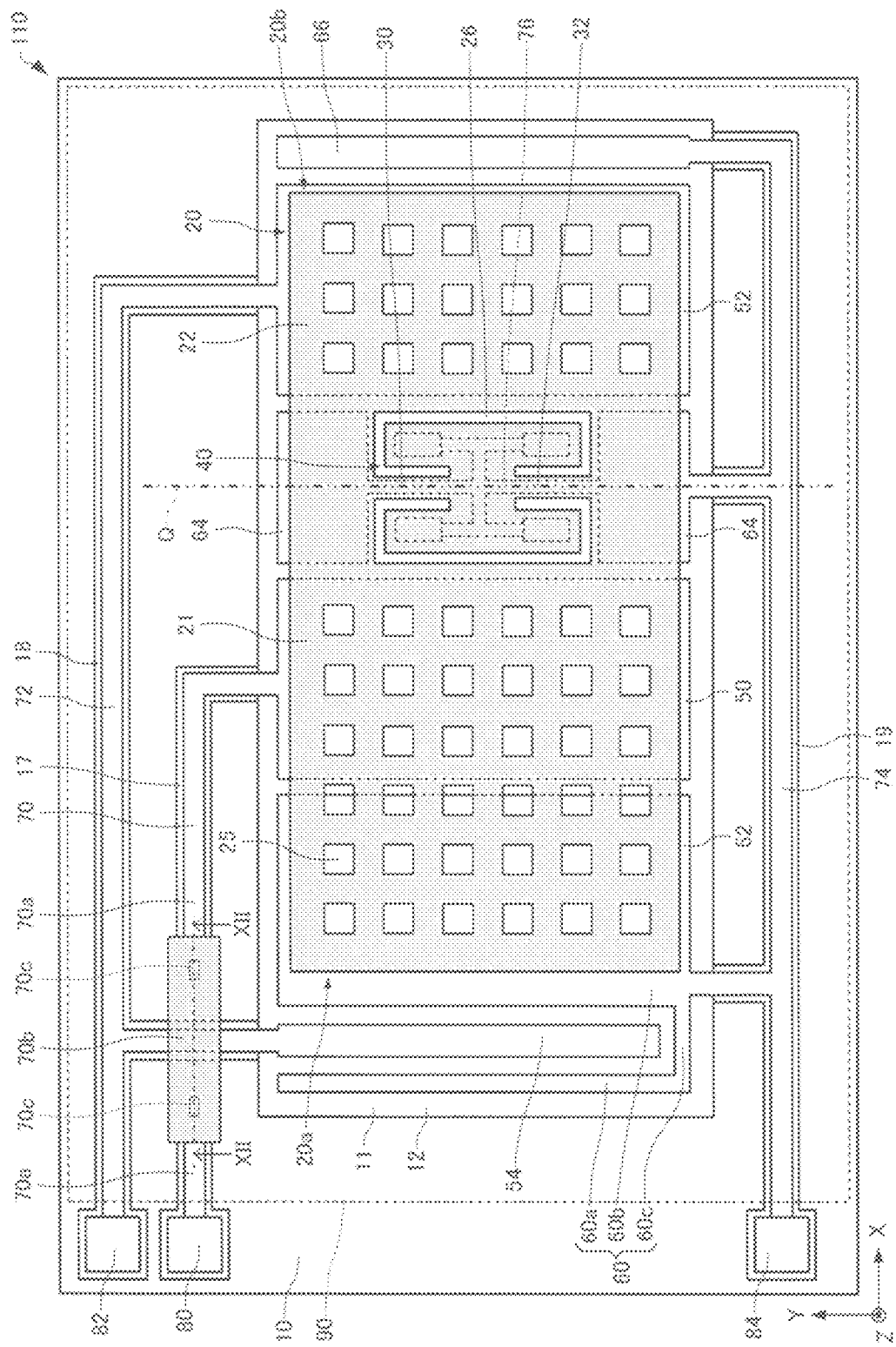
FIG. 11 is a plan view schematically showing a physical quantity sensor according to a first modified example of the first embodiment.
Figure 12:
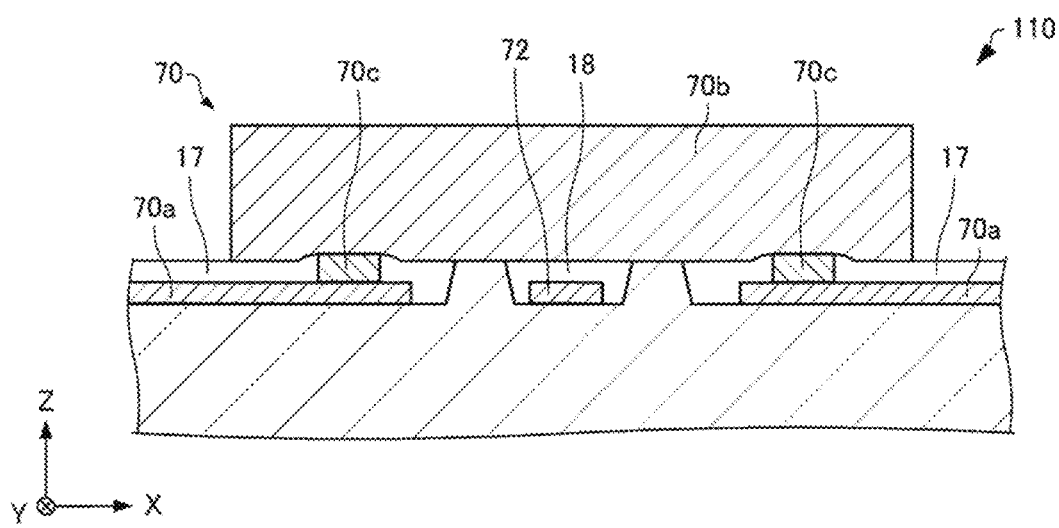
FIG. 12 is a cross-sectional view schematically showing the physical quantity sensor according to the first modified example of the first embodiment.
Figure 13:
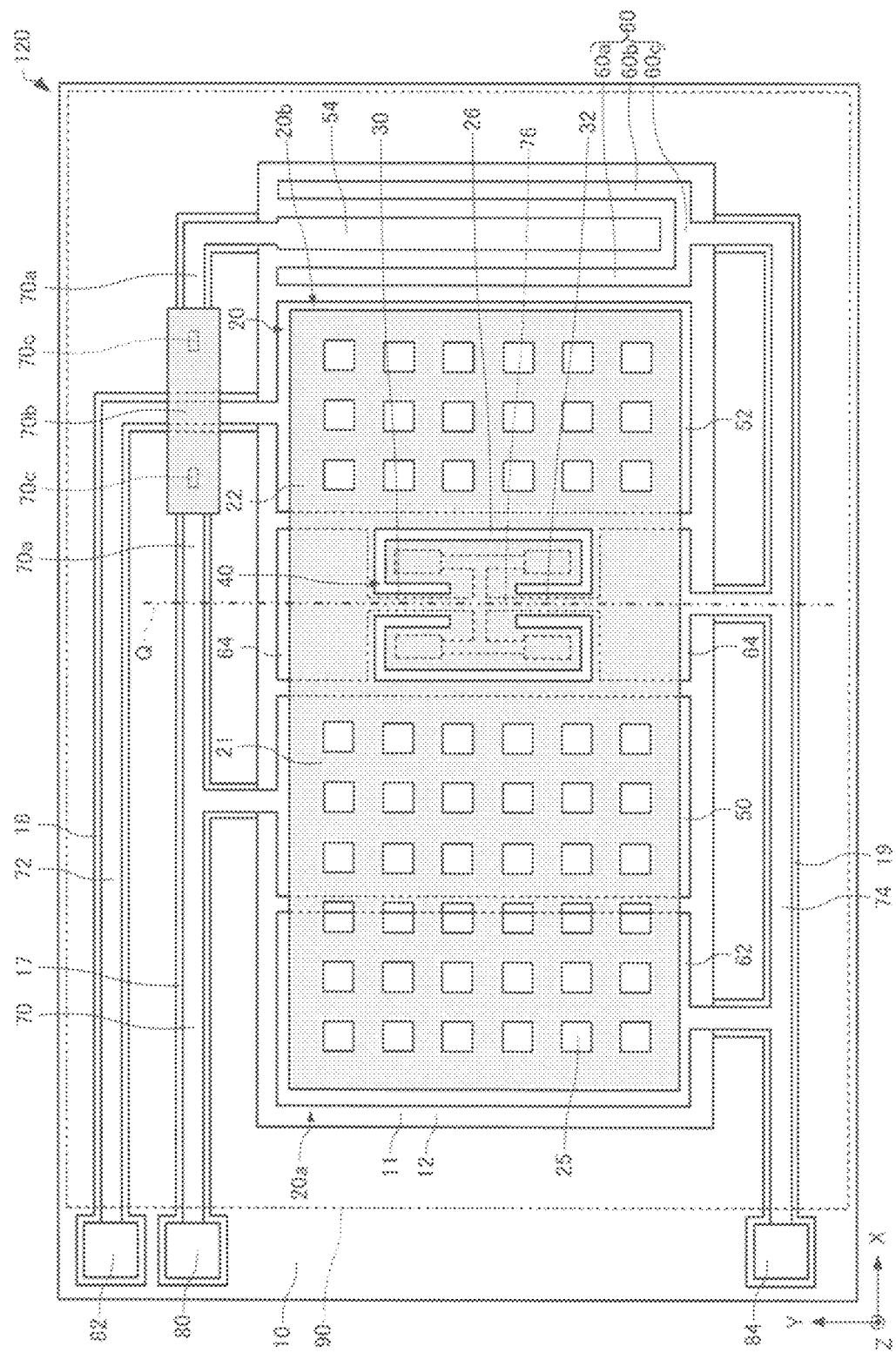
FIG. 13 is a plan view schematically showing a physical quantity sensor according to a second modified example of the first embodiment.
Figure 14:
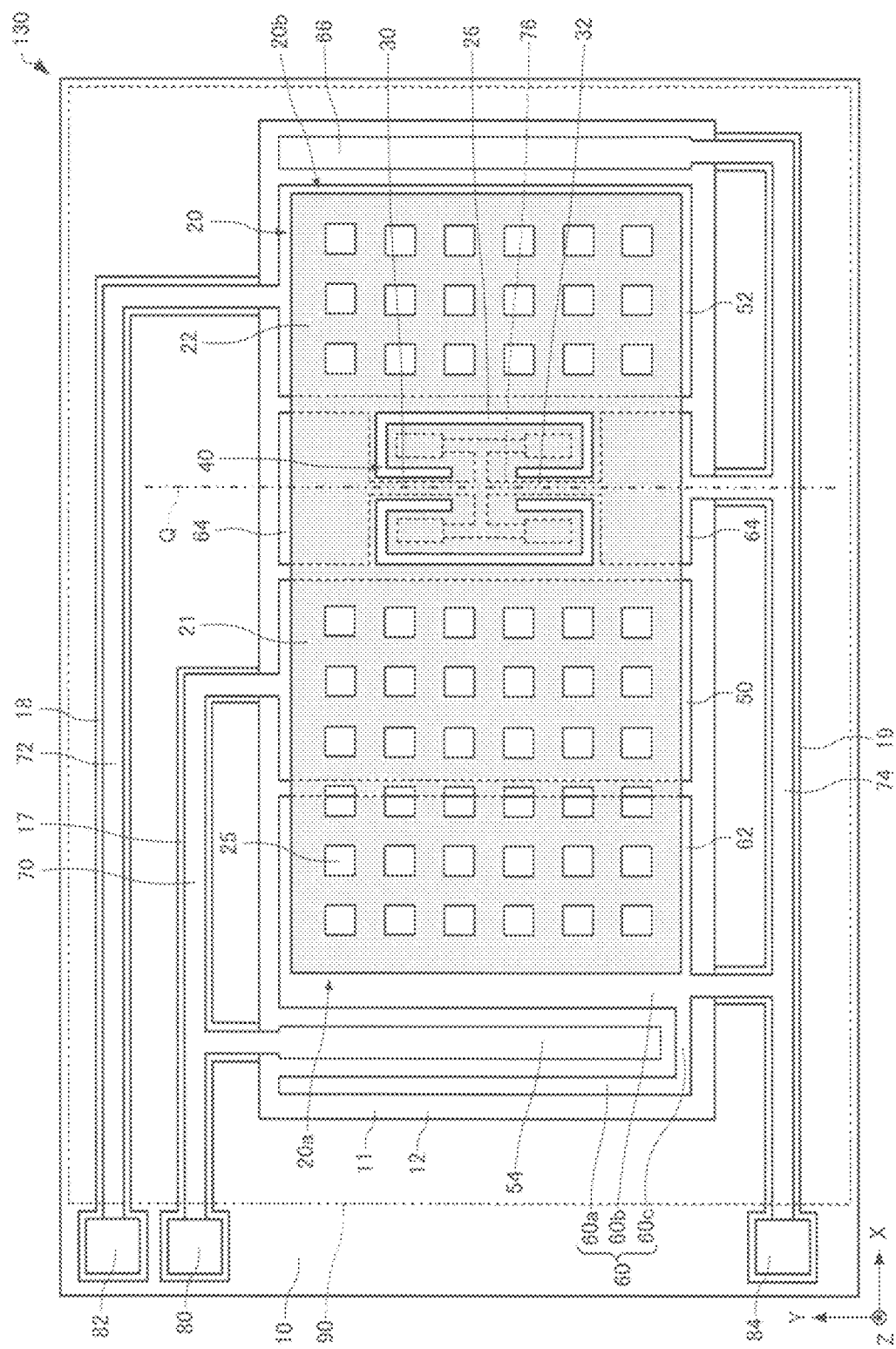
FIG. 14 is a plan view schematically showing a physical quantity sensor according to a third modified example of the first embodiment.

1.3. Modified Examples of Physical Quantity Sensor 1.3.1. First Modified Example Next, a physical quantity sensor according to a first modified example of the first embodiment will be described with reference to the drawings. FIG. 11 is a plan view schematically showing the physical quantity sensor 110 according to the first modified example of the first embodiment. FIG. 12 is a cross-sectional view schematically showing the physical quantity sensor 110 according to the first modified example of the first embodiment, taken along line XII-XII in FIG. 11. For convenience sake, the lid 90 is shown in a see-through manner in FIG. 11, and FIGS. 13 and 14 shown below. Moreover, the lid 90 is not shown in FIG. 12. The X-axis, the Y-axis, and the Z-axis are shown as three axes orthogonal to each other in FIGS. 11 and 12, and FIGS. 13 and 14 shown below.

Hereinafter, in the physical quantity sensor 110 according to the first modified example of the first embodiment, members having functions similar to those of the constituent members of the physical quantity sensor 100 described above are denoted by the same reference numerals and signs, and a detailed description of the members is omitted.

In the physical quantity sensor 100 described above, the third fixed electrode 54 is provided on the other side (the +X-axis direction side) of the support axis Q in the direction crossing the extending direction thereof in the plan view as shown in FIG. 1. In contrast, in the physical quantity sensor 110, the third fixed electrode 54 is provided on the one side (the −X-axis direction side) of the support axis Q in the direction crossing the extending direction thereof in the plan view as shown in FIG. 11.

In the physical quantity sensor 110, the second dummy electrode 62 is provided between the first fixed electrode 50 and the third fixed electrode 54. The first dummy electrode 60 and the second dummy electrode 62 are connected together. In the illustrated example, the second arm 60*b* of the first dummy electrode 60 and the second dummy electrode 62 are connected together.

The physical quantity sensor 110 includes a fourth dummy electrode 66. The fourth dummy electrode 66 is fixed to the substrate 10. The fourth dummy electrode 66 is provided on the substrate 10. In the illustrated example, the fourth dummy electrode 66 is provided on the bottom surface 12 of the recess 11. The fourth dummy electrode 66 is electrically connected with the movable body 20 through the third wiring 74, the third dummy electrode 64, the fourth wiring 76, the support 40, and the couplers 30 and 32. The fourth dummy electrode 66 has, for example, the same potential as the movable body 20. The material of the fourth dummy electrode 66 is, for example, the same as the material of the fixed electrodes 50, 52, and 54. The fourth dummy electrode 66 forms a capacitance with the second fixed electrode 52. The fourth dummy electrode 66 is formed in, for example, the same process as the dummy electrodes 60, 62, and 64.

As shown in FIGS. 11 and 12, the first wiring 70 includes metal sections 70*a*, a silicon section 70*b*, and bumps 70*c*. The metal sections 70*a* are provided in the first groove 17. The silicon section 70*b* is not provided in the first groove 17. The silicon section 70*b* is provided on the upper surface of the substrate 10. The silicon section 70*b* crosses the second wiring 72 in the plan view. The silicon section 70*b* is provided above and spaced apart from the second wiring 72. The bump 70*c* connects the metal section 70*a* with the silicon section 70*b*. The bumps 70*c* are provided in the first groove 17. In the illustrated example, the upper surface of the bump 70*c* is located higher than the upper surface of the substrate 10.

The material of the metal section 70*a* and the bump 70*c* is, for example, the same as the material of the wirings 72 and 74 and the wiring layer 76*a*. The material of the silicon section 70*b* is, for example, the same as the material of the movable body 20. The material of the bump 70*c* is, for example, the same as the material of the bump 76*b*. The metal section 70*a* is formed in, for example, the same process as the wirings 72 and 74 and the wiring layer 76*a*. The silicon section 70*b* is formed by, for example, patterning the silicon substrate 102 (see FIG. 9). The bump 70*c* is formed in, for example, the same process as the bump 76*b*.

The physical quantity sensor 110 can have advantageous effects similar to those of the physical quantity sensor 100 described above.

Although not illustrated, not the first wiring 70 but the second wiring 72 may include the metal section, the silicon section, and the bump described above.

Although not illustrated, the third fixed electrode 54 and the first dummy electrode 60 may also be provided on the +X-axis direction side of the second fixed electrode 52 as in the physical quantity sensor 100 shown in FIG. 1. That is, a physical quantity sensor according to the invention may take a form in which the physical quantity sensor 100 and the physical quantity sensor 110 are combined together. In this case, the fourth dummy electrode 66 may not be provided.

1.3.2. Second Modified Example

Next, a physical quantity sensor according to a second modified example of the first embodiment will be described with reference to the drawing. FIG. 13 is a plan view schematically showing the physical quantity sensor 120 according to the second modified example of the first embodiment.

Hereinafter, in the physical quantity sensor 120 according to the second modified example of the first embodiment, members having functions similar to those of the constituent members of the physical quantity sensors 100 and 110 described above are denoted by the same reference numerals and signs, and a detailed description of the members is omitted.

In the physical quantity sensor 100 described above, the third fixed electrode 54 is electrically connected with the second fixed electrode 52 through the second wiring 72 as shown in FIG. 1. In contrast, in the physical quantity sensor 120, the third fixed electrode 54 is electrically connected with the first fixed electrode 50 through the first wiring 70 as shown in FIG. 13. The first wiring 70 includes the metal sections 70*a*, the silicon section 70*b*, and the bumps 70*c*.

In the physical quantity sensor 120, if the third fixed electrode 54 is not provided, the first capacitance detected by the pads 80 and 84 is smaller than the second capacitance detected by the pads 82 and 84 in the state where acceleration is not applied. In the physical quantity sensor 120, by providing the third fixed electrode 54 electrically connected with the first fixed electrode 50, a capacitance can be formed by the third fixed electrode 54 and the first dummy electrode 60, and therefore, the first capacitance can be increased. Therefore, in the physical quantity sensor 120, the capacitance offset can be reduced.

1.3.3. Third Modified Example

Next, a physical quantity sensor according to a third modified example of the first embodiment will be described with reference to the drawing. FIG. 14 is a plan view schematically showing the physical quantity sensor 130 according to the third modified example of the first embodiment.

Hereinafter, in the physical quantity sensor 130 according to the third modified example of the first embodiment, members having functions similar to those of the constituent members of the physical quantity sensors 100, 110, and 120 described above are denoted by the same reference numerals and signs, and a detailed description of the members is omitted.

In the physical quantity sensor 100 described above, the third fixed electrode 54 is provided on the other side (the +X-axis direction side) of the support axis Q in the direction crossing the extending direction thereof in the plan view as shown in FIG. 1. Further, in the physical quantity sensor 100, the third fixed electrode 54 is electrically connected with the second fixed electrode 52 through the second wiring 72 as shown in FIG. 1.

In contrast, in the physical quantity sensor 130, the third fixed electrode 54 is provided on the one side (the −X-axis direction side) of the support axis Q in the plan view as shown in FIG. 14. Further, in the physical quantity sensor 130, the third fixed electrode 54 is electrically connected with the first fixed electrode 50 through the first wiring 70. The physical quantity sensor 130 includes the fourth dummy electrode 66.

The physical quantity sensor 130 can have advantageous effects similar to those of the physical quantity sensor 120 described above.

Although not illustrated, the third fixed electrode 54 and the first dummy electrode 60 may also be provided on the +X-axis direction side of the second fixed electrode 52 as in the physical quantity sensor 120 shown in FIG. 13. That is, a physical quantity sensor according to the invention may take a form in which the physical quantity sensor 120 and the physical quantity sensor 130 are combined together. In this case, the fourth dummy electrode 66 may not be provided.

2. Second Embodiment

2.1. Physical Quantity Sensor

Figure 15:
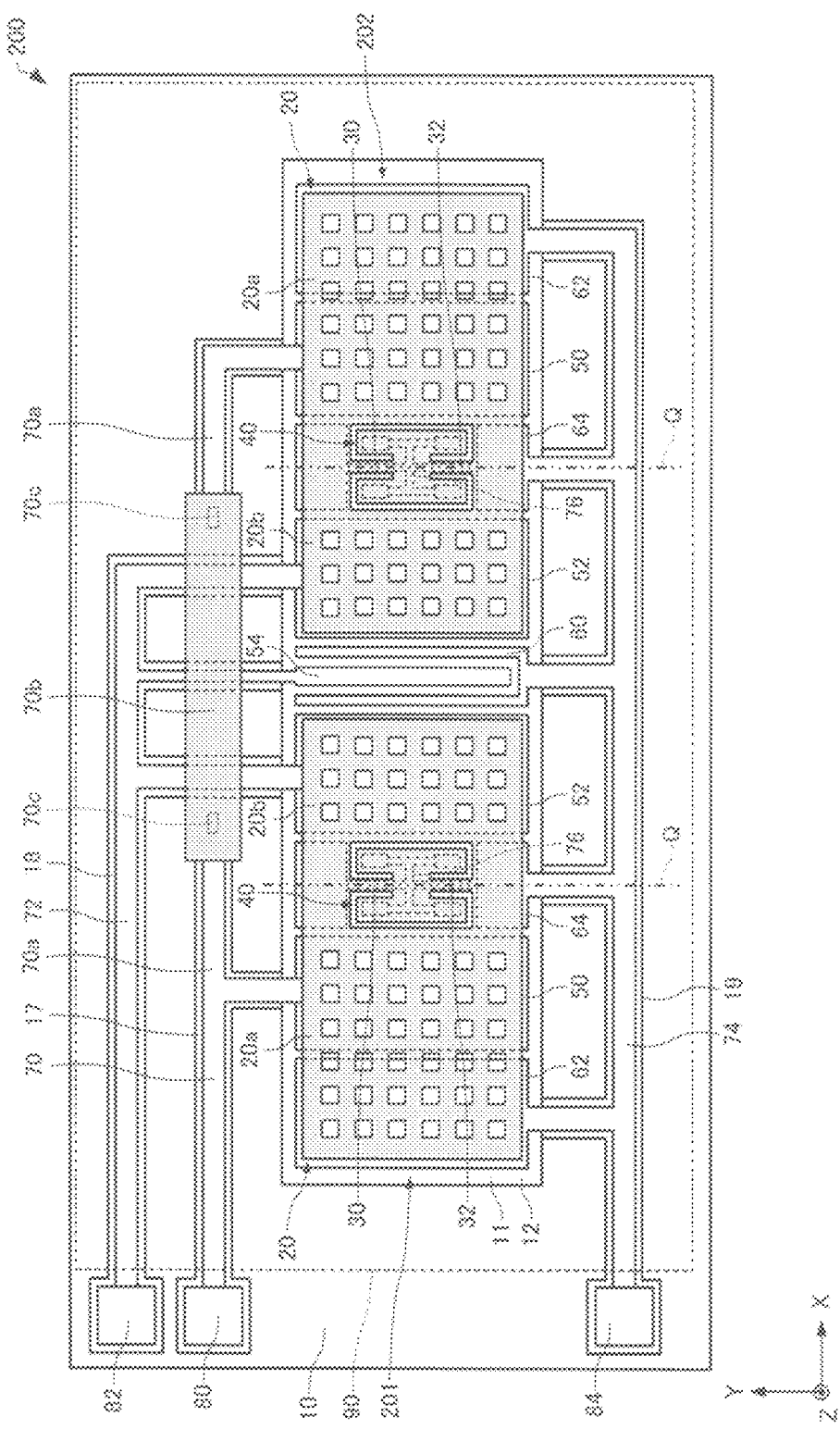
FIG. 15 is a plan view schematically showing a physical quantity sensor according to a second embodiment.

Next, a physical quantity sensor according to a second embodiment will be described with reference to the drawing. FIG. 15 is a plan view schematically showing the physical quantity sensor 200 according to the second embodiment. For convenience sake, the lid 90 is shown in a see-through manner in FIG. 15. Moreover, the X-axis, the Y-axis, and the Z-axis are shown as three axes orthogonal to each other in FIG. 15.

Hereinafter, in the physical quantity sensor 200 according to the second embodiment, members having functions similar to those of the constituent members of the physical quantity sensors 100, 110, 120, and 130 described above are denoted by the same reference numerals and signs, and a detailed description of the members is omitted.

In the physical quantity sensor 100 described above, one movable body 20 is provided as shown in FIG. 1. In contrast, in the physical quantity sensor 200, two movable bodies 20 are provided as shown in FIG. 15.

In the physical quantity sensor 200, two structures each of which is configured to include the movable body 20, the couplers 30 and 32, the support 40, the fixed electrodes 50, 52, and 54, the dummy electrodes 60, 62, and 64, and the fourth wiring 76 are provided (a first structure 201 and a second structure 202). The structures 201 and 202 are arranged in the X-axis direction. That is, the two movable bodies 20 are arranged so as to be along the direction crossing (specifically, the direction orthogonal to) the extending direction of the support axis Q. The structures 201 and 202 are provided line-symmetrically about a virtual axis (not shown) parallel to the Y-axis in a plan view. The first structure 201 is provided on the −X-axis direction side of the second structure 202.

In the illustrated example, the third fixed electrode 54 of the first structure 201 and the third fixed electrode 54 of the second structure 202 are integrally provided and constitute a common third fixed electrode 54. Further, the first dummy electrode 60 of the first structure 201 and the first dummy electrode 60 of the second structure 202 are integrally provided and constitute a common first dummy electrode 60. With this configuration, the number of components can be reduced in the physical quantity sensor 200, and thus the miniaturization thereof can be achieved.

Although not illustrated, the third fixed electrode 54 of the first structure 201 and the third fixed electrode 54 of the second structure 202 may not constitute the common third fixed electrode 54 but may be provided one by one in the structures 201 and 202. Similarly, the first dummy electrode 60 of the first structure 201 and the first dummy electrode 60 of the second structure 202 may not constitute the common first dummy electrode 60 but may be provided one by one in the structures 201 and 202.

The third fixed electrode 54 is provided between the second fixed electrode 52 of the first structure 201 and the second fixed electrode 52 of the second structure 202. The third fixed electrode 54 is electrically connected with the second fixed electrodes 52. The first wiring 70 includes the metal sections 70a, the silicon section 70b, and the bumps 70c.

The physical quantity sensor 200 can have advantageous effects similar to those of the physical quantity sensor 100 described above.

In the physical quantity sensor 200, two movable bodies 20 are provided. Therefore, in the physical quantity sensor 200, even when acceleration containing a component in another axial (the X-axis or the Y-axis) direction other than the Z-axis direction is applied, the component in another axial direction can be canceled by differential detection. Hence, in the physical quantity sensor 200, acceleration in the Z-axis direction can be more accurately detected.

Although not illustrated, the third fixed electrode 54 may be electrically connected with the first fixed electrode 50 as in the physical quantity sensor 120 shown in FIG. 13.

2.2. Method of Manufacturing Physical Quantity Sensor

Next, a method of manufacturing the physical quantity sensor 200 according to the second embodiment will be described. The method of manufacturing the physical quantity sensor 200 according to the second embodiment is basically the same as the method of manufacturing the physical quantity sensor 100 according to the first embodiment described above. Hence, a detailed description of the manufacturing method is omitted.

2.3. Modified Example of Physical Quantity Sensor

Figure 16:
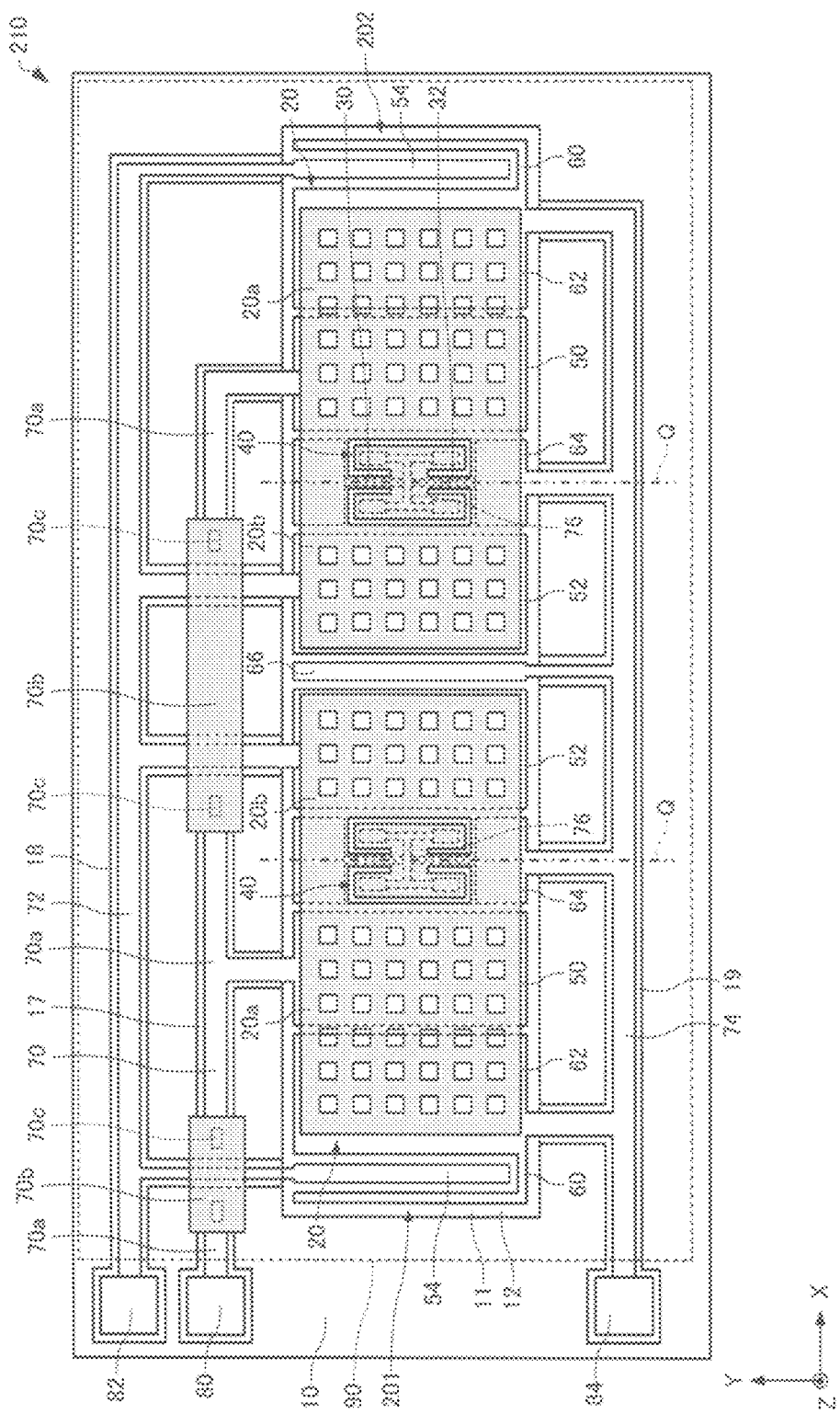
FIG. 16 is a plan view schematically showing a physical quantity sensor according to a modified example of the second embodiment.

Next, a physical quantity sensor according to a modified example of the second embodiment will be described with reference to the drawing. FIG. 16 is a plan view schematically showing the physical quantity sensor 210 according to the modified example of the second embodiment. For convenience sake, the lid 90 is shown in a see-through manner in FIG. 16. Moreover, the X-axis, the Y-axis, and the Z-axis are shown as three axes orthogonal to each other in FIG. 16.

Hereinafter, in the physical quantity sensor 210 according to the modified example of the second embodiment, members having functions similar to those of the constituent members of the physical quantity sensors 100, 110, 120, 130, and 200 described above are denoted by the same reference numerals and signs, and a detailed description of the members is omitted.

In the physical quantity sensor 200 described above, the third fixed electrode 54 is provided between the second fixed electrode 52 of the first structure 201 and the second fixed electrode 52 of the second structure 202 as shown in FIG. 15.

In contrast, in the physical quantity sensor 210, the third fixed electrode 54 of the first structure 201 is provided on the −X-axis direction side of the first fixed electrode 50 of the first structure 201, and the third fixed electrode 54 of the second structure 202 is provided on the +X-axis direction side of the first fixed electrode 50 of the second structure 202, as shown in FIG. 16. The first dummy electrode 60 and the second dummy electrode 62 are connected together. The third fixed electrode 54 is electrically connected with the second fixed electrode 52.

The structures 201 and 202 include the fourth dummy electrode 66. In the illustrated example, the fourth dummy electrode 66 of the first structure 201 and the fourth dummy electrode 66 of the second structure 202 are integrally provided and constitute a common fourth dummy electrode 66. With this configuration, the number of components can be reduced in the physical quantity sensor 210, and thus the miniaturization thereof can be achieved.

Although not illustrated, the fourth dummy electrode 66 of the first structure 201 and the fourth dummy electrode 66 of the second structure 202 may not constitute the common fourth dummy electrode 66 but may be provided one by one in the structures 201 and 202.

The physical quantity sensor 210 can have advantageous effects similar to those of the physical quantity sensor 200 described above.

Although not illustrated, the third fixed electrode 54 may be electrically connected with the first fixed electrode 50 as in the physical quantity sensor 130 shown in FIG. 14.

3. Third Embodiment

3.1. Physical Quantity Sensor

Figure 17:
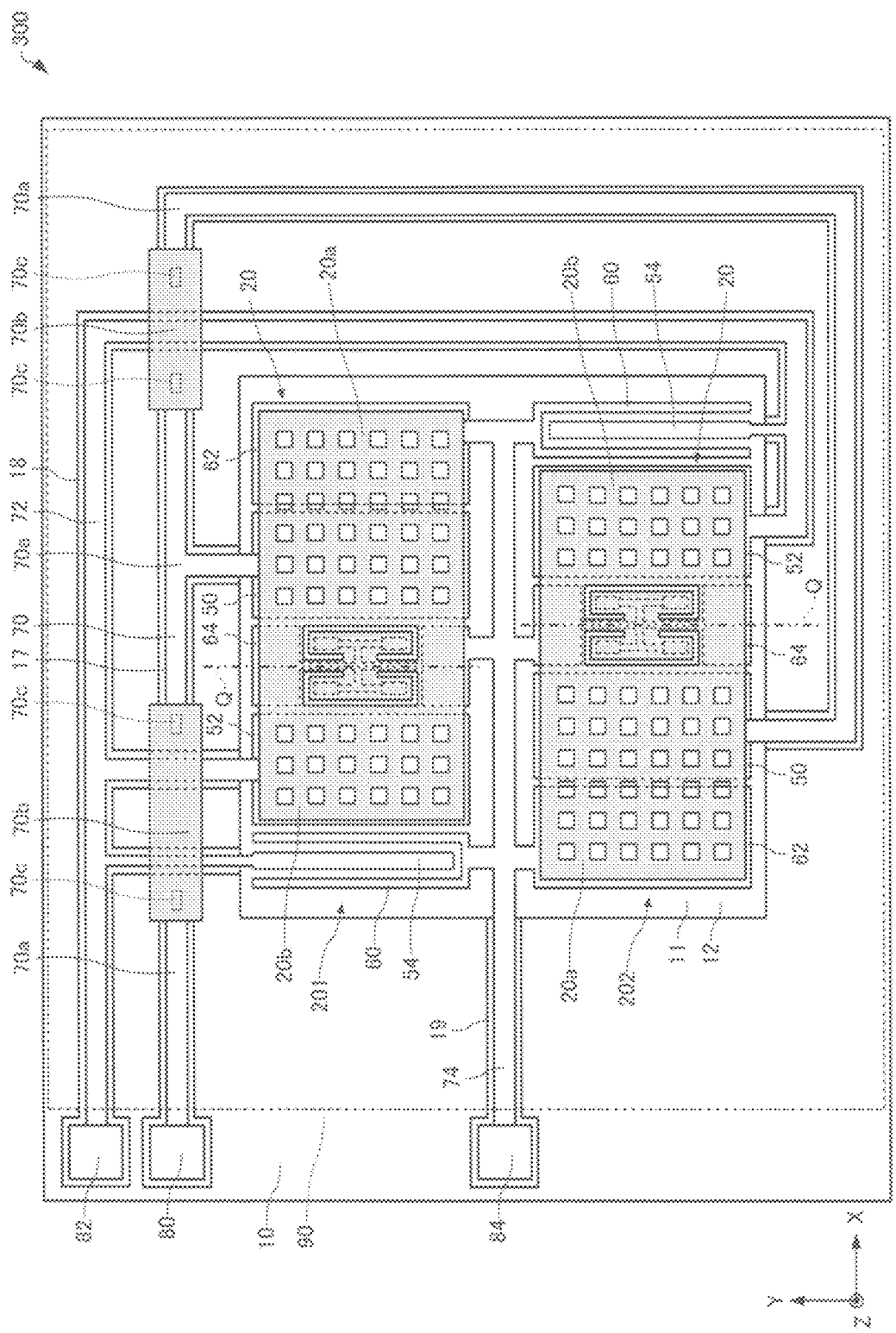
FIG. 17 is a plan view schematically showing a physical quantity sensor according to a third embodiment.

Next, a physical quantity sensor according to a third embodiment will be described with reference to the drawing. FIG. 17 is a plan view schematically showing the physical quantity sensor 300 according to the third embodiment. For convenience sake, the lid 90 is shown in a see-through manner in FIG. 17. Moreover, the X-axis, the Y-axis, and the Z-axis are shown as three axes orthogonal to each other in FIG. 17.

Hereinafter, in the physical quantity sensor 300 according to the third embodiment, members having functions similar to those of the constituent members of the physical quantity sensors 100, 110, 120, 130, 200, and 210 described above are denoted by the same reference numerals and signs, and a detailed description of the members is omitted.

In the physical quantity sensor 200 described above, the structures 201 and 202 are arranged in the X-axis direction as shown in FIG. 15. In contrast, in the physical quantity sensor 300, the structures 201 and 202 are arranged in the Y-axis direction as shown in FIG. 17. That is, two movable bodies 20 are arranged so as to be along the extending direction of the support axis Q. The structures 201 and 202 are provided, for example, point-symmetrically about a virtual point (not shown) between the structures 201 and 202. The first structure 201 is provided on the +Y-axis direction side of the second structure 202. The third fixed electrode 54 is electrically connected with the second fixed electrode 52.

The physical quantity sensor 300 can have advantageous effects similar to those of the physical quantity sensor 200 described above.

Although not illustrated, the third fixed electrode 54 may be provided not on the second seesaw piece 20b side but on the first seesaw piece 20a side as in the physical quantity sensor 110 shown in FIG. 11.

Although not illustrated, the third fixed electrode 54 may be electrically connected with the first fixed electrode 50 as in the physical quantity sensors 120 and 130 shown in FIGS. 13 and 14.

3.2. Method of Manufacturing Physical Quantity Sensor

Next, a method of manufacturing the physical quantity sensor 300 according to the third embodiment will be described. The method of manufacturing the physical quantity sensor 300 according to the third embodiment is basically the same as the method of manufacturing the physical quantity sensor 100 according to the first embodiment described above. Hence, a detailed description of the manufacturing method is omitted.

3.3. Modified Examples of Physical Quantity Sensor

3.3.1. First Modified Example

Figure 18:
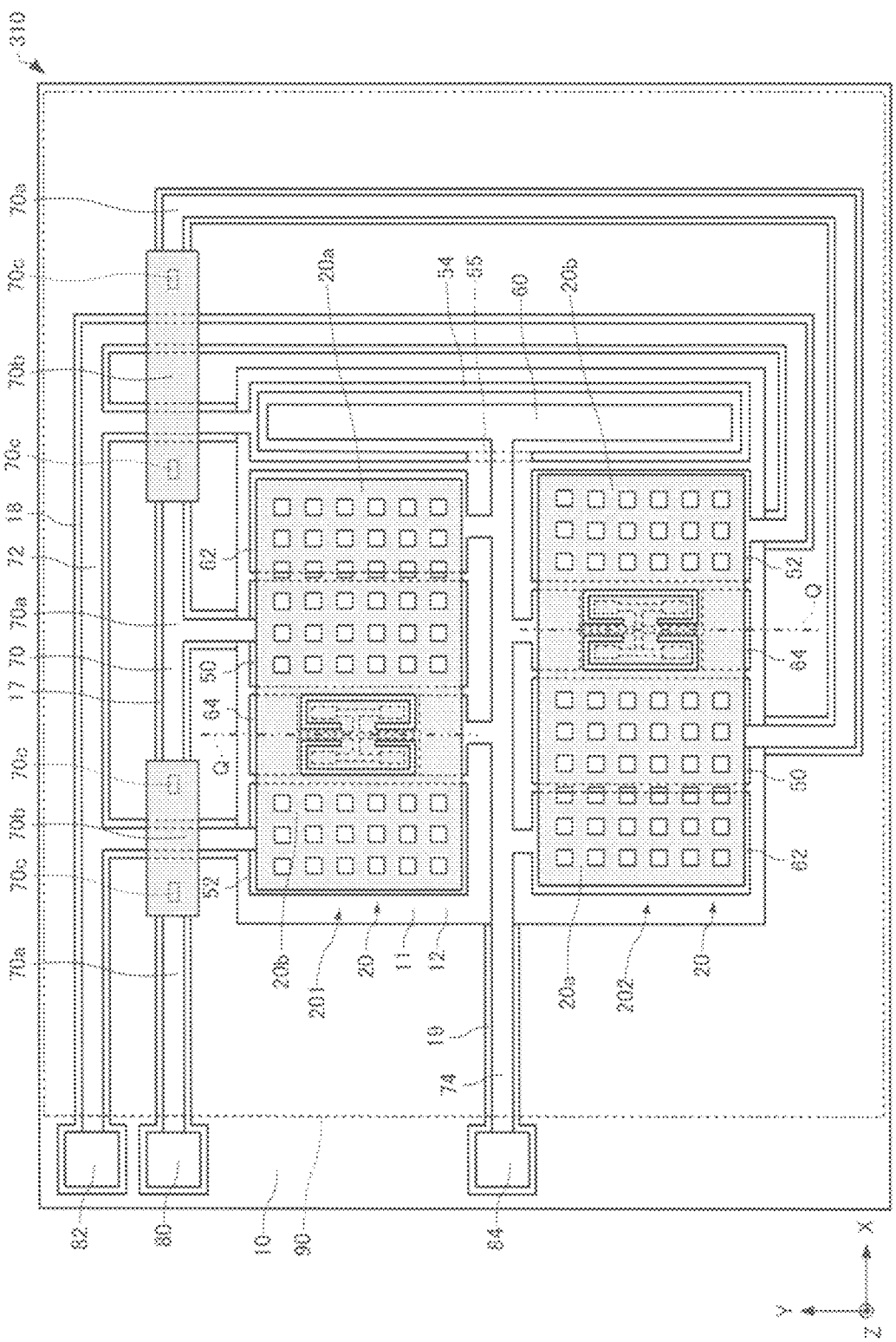
FIG. 18 is a plan view schematically showing a physical quantity sensor according to a first modified example of the third embodiment.
Figure 19:
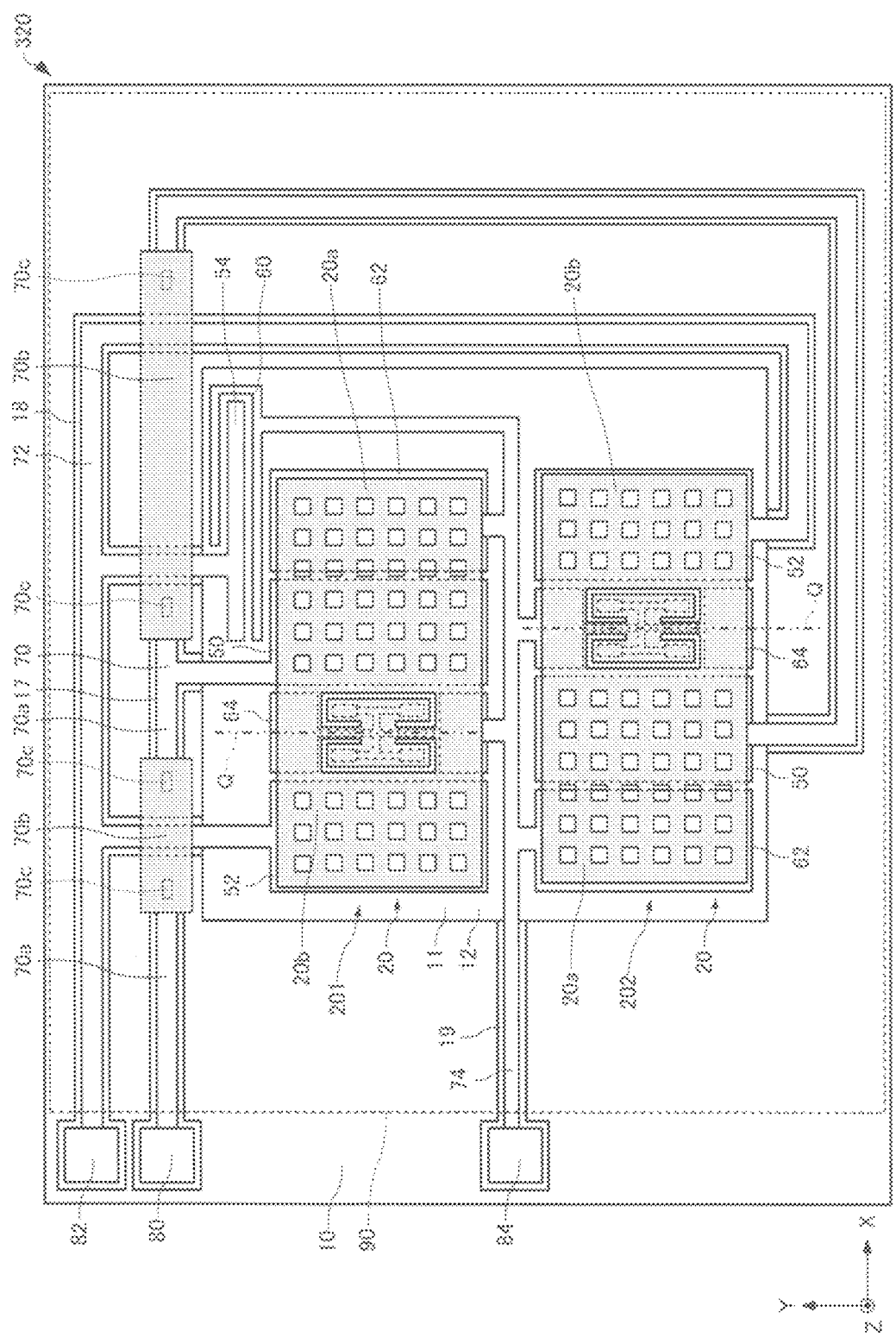
FIG. 19 is a plan view schematically showing a physical quantity sensor according to a second modified example of the third embodiment.

Next, a physical quantity sensor according to a first modified example of the third embodiment will be described with reference to the drawing. FIG. 18 is a plan view schematically showing the physical quantity sensor 310 according to the first modified example of the third embodiment. For convenience sake, the lid 90 is shown in a see-through manner in FIG. 18, and FIG. 19 shown below. Moreover, the X-axis, the Y-axis, and the Z-axis are shown as three axes orthogonal to each other in FIG. 18, and FIG. 19 shown below.

Hereinafter, in the physical quantity sensor 310 according to the first modified example of the third embodiment, members having functions similar to those of the constituent members of the physical quantity sensors 100, 110, 120, 130, 200, 210, and 300 described above are denoted by the same reference numerals and signs, and a detailed description of the members is omitted.

In the physical quantity sensor 300 described above, each of the structures 201 and 202 includes the third fixed electrode 54 as shown in FIG. 17. In contrast, in the physical quantity sensor 300, the third fixed electrode 54 of the first structure 201 and the third fixed electrode 54 of the second structure 202 are integrally provided and constitute a common third fixed electrode 54 as shown in FIG. 18.

The third fixed electrode 54 is provided on, for example, the +X-axis direction side of the movable bodies 20 of the structures 201 and 202 in a plan view. In the illustrated example, the third fixed electrode 54 is provided in the plan view around the first dummy electrode 60 having a rectangular shape. The third fixed electrode 54 includes an opening 55. The third wiring 74 passes through the opening 55 to be connected with the first dummy electrode 60. The third fixed electrode 54 is electrically connected with the second fixed electrode 52.

The physical quantity sensor 310 can have advantageous effects similar to those of the physical quantity sensor 210 described above.

Although not illustrated, the third fixed electrode 54 may be electrically connected with the first fixed electrode 50 as in the physical quantity sensors 120 and 130 shown in FIGS. 13 and 14.

3.3.2. Second Modified Example

Next, a physical quantity sensor according to a second modified example of the third embodiment will be described with reference to the drawing. FIG. 19 is a plan view schematically showing the physical quantity sensor 320 according to the second modified example of the third embodiment.

Hereinafter, in the physical quantity sensor 320 according to the second modified example of the third embodiment, members having functions similar to those of the constituent members of the physical quantity sensors 100, 110, 120, 130, 200, 210, 300, and 310 described above are denoted by the same reference numerals and signs, and a detailed description of the members is omitted.

In the physical quantity sensor 300 described above, each of the structures 201 and 202 includes the third fixed electrode 54 as shown in FIG. 17. In contrast, in the physical quantity sensor 320, the third fixed electrode 54 of the first structure 201 and the third fixed electrode 54 of the second structure 202 are integrally provided and constitute a common third fixed electrode 54 as shown in FIG. 19. The third fixed electrode 54 is provided on, for example, the +Y-axis direction side of the movable bodies 20 of the structures 201 and 202 in a plan view.

The physical quantity sensor 320 can have advantageous effects similar to those of the physical quantity sensor 300 described above.

In the physical quantity sensor 320, the third fixed electrode 54 is provided on the Y-axis direction side of the movable bodies 20 of the structures 201 and 202 in the plan view. Therefore, in the physical quantity sensor 320, the length thereof in the X-axis direction can be reduced, compared to the case where the third fixed electrode 54 is provided on the X-axis direction side of the structures 201 and 202 in the plan view.

Although not illustrated, the third fixed electrode 54 may be electrically connected with the first fixed electrode 50 as in the physical quantity sensors 120 and 130 shown in FIGS. 13 and 14.

4. Fourth Embodiment

Figure 20:
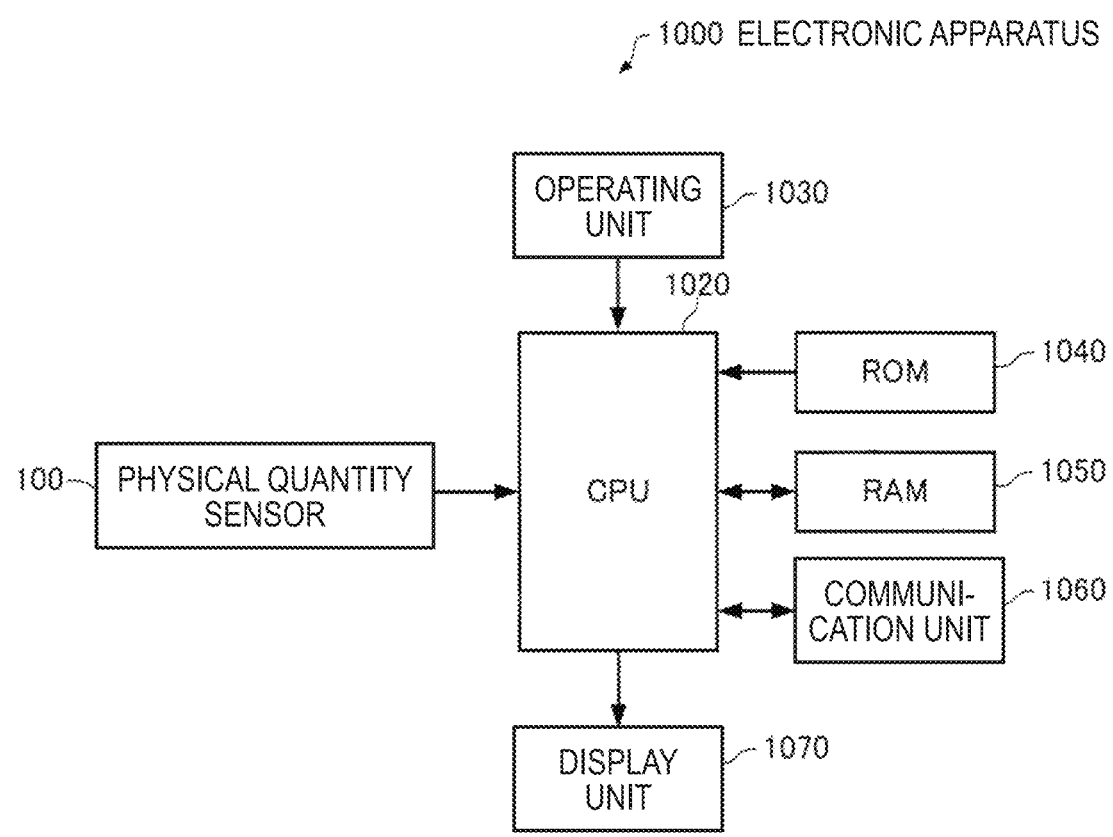
FIG. 20 is a functional block diagram of an electronic apparatus according to a fourth embodiment.

Next, an electronic apparatus according to a fourth embodiment will be described with reference to the drawings. FIG. 20 is a functional block diagram of the electronic apparatus 1000 according to the fourth embodiment.

The electronic apparatus 1000 includes a physical quantity sensor according to the invention. In the following, the electronic apparatus 1000 including the physical quantity sensor 100 as a physical quantity sensor according to the invention will be described.

The electronic apparatus 1000 is configured to further include a central processing unit (CPU) 1020, an operating unit 1030, a read only memory (ROM) 1040, a random access memory (RAM) 1050, a communication unit 1060, and a display unit 1070. In the electronic apparatus of the embodiment, a portion of the constituent elements (parts) in FIG. 20 may be omitted or modified, or other constituent elements may be added.

The central processing unit 1020 performs various calculation processes or control processes according to programs stored in the ROM 1040 or the like. Specifically, the central processing unit 1020 performs various processes in response to an output signal of the physical quantity sensor 100 or an operating signal from the operating unit 1030, a process for controlling the communication unit 1060 to perform data communication with an external device, a process for transmitting a display signal for causing the display unit 1070 to display various information, and the like.

The operating unit 1030 is an input device composed of operation keys, button switches, or the like, and outputs an operating signal in response to a user's operation to the central processing unit 1020.

The ROM 1040 stores programs for the central processing unit 1020 to perform various calculation processes or control processes, data, and the like.

The RAM 1050 is used as a working area of the central processing unit 1020, and temporarily stores programs or data read from the ROM 1040, data input from the physical quantity sensor 100, data input from the operating unit 1030, the results of arithmetic operations executed by the central processing unit 1020 according to the various programs, and the like.

The communication unit 1060 performs various controls for establishing data communication between the central processing unit 1020 and the external device.

The display unit 1070 is a display device composed of a liquid crystal display (LCD) or the like, and displays various information based on the display signal input from the central processing unit 1020. The display unit 1070 may be provided with a touch panel that functions as the operating unit 1030.

Various electronic apparatuses are conceivable as the electronic apparatus 1000. Examples thereof include, for example, a personal computer (e.g., a mobile personal computer, a laptop personal computer, or a tablet personal computer), a mobile terminal such as a smartphone or a mobile phone, a digital still camera, an inkjet ejecting apparatus (e.g., an inkjet printer), a storage area network apparatus such as a router or a switch, a local area network apparatus, a mobile terminal base station apparatus, a television set, a video camcorder, a video recorder, a car navigation system, a real-time clock device, a pager, an electronic notebook (including one with a communication function), an electronic dictionary, a calculator, an electronic game machine, a game controller, a word processor, a workstation, a videophone, a security television monitor, electronic binoculars, a POS terminal, a medical device (e.g., an electronic thermometer, a sphygmomanometer, a blood glucose meter, an electrocardiogram measuring system, an ultrasonic diagnosis device, or an electronic endoscope), a fishfinder, various measuring instruments, gauges (e.g., gauges for a vehicle, aircraft, and a ship), a flight simulator, a head-mounted display, motion tracing, motion tracking, a motion controller, and pedestrian dead reckoning (PDR).

Figure 21:
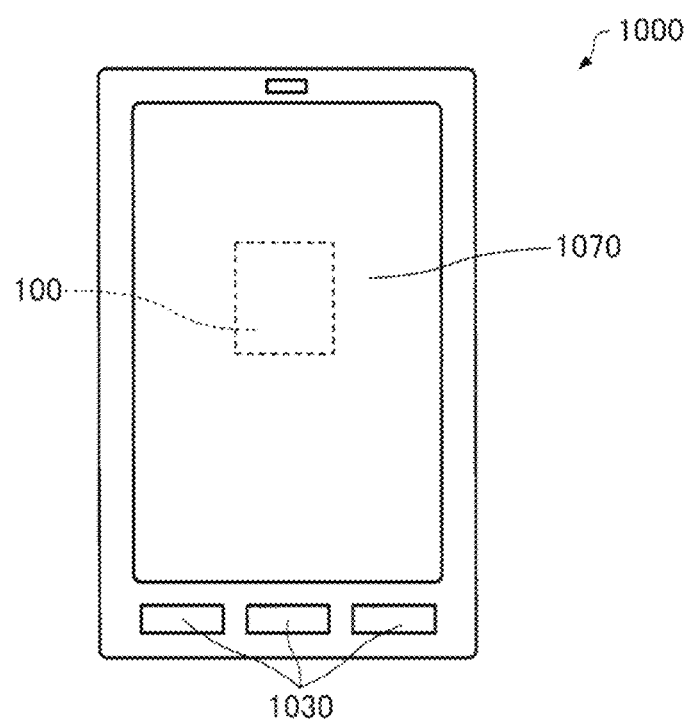
FIG. 21 is a diagram schematically showing an external appearance of a smartphone as an example of the electronic apparatus according to the fourth embodiment.

FIG. 21 is a diagram showing an example of an external appearance of a smartphone as an example of the electronic apparatus 1000. The smartphone as the electronic apparatus 1000 includes buttons as the operating unit 1030, and an LCD as the display unit 1070.

Figure 22:
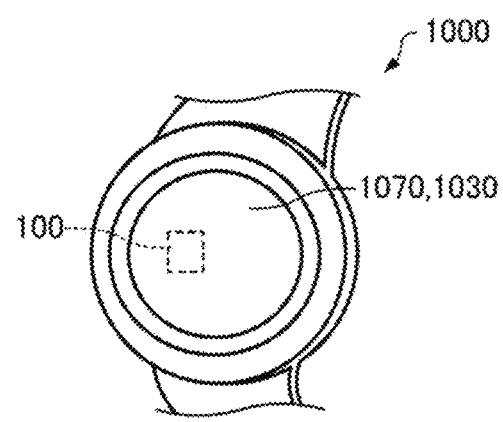
FIG. 22 is a diagram schematically showing an external appearance of a wearable apparatus as an example of the electronic apparatus according to the fourth embodiment.

FIG. 22 is a diagram showing an example of an external appearance of a wrist-worn portable apparatus (wearable apparatus) as an example of the electronic apparatus 1000. The wearable apparatus as the electronic apparatus 1000 includes an LCD as the display unit 1070. The display unit 1070 may be provided with a touch panel that functions as the operating unit 1030.

The portable apparatus as the electronic apparatus 1000 includes, for example, a position sensor such as a global positioning system (GPS) receiver, and can measure the movement distance and movement path of the user.

5. Fifth Embodiment

Figure 23:
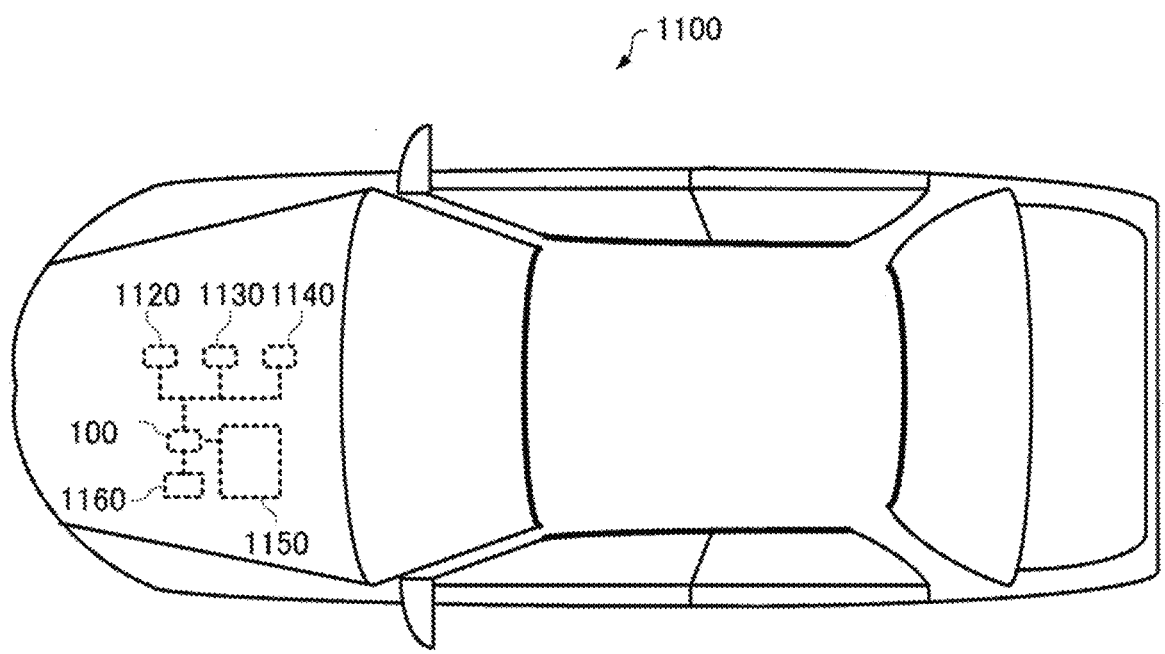
FIG. 23 is a plan view schematically showing a vehicle according to a fifth embodiment.

Next, a vehicle according to a fifth embodiment will be described with reference to the drawing. FIG. 23 is a perspective view schematically showing an automobile as the vehicle 1100 according to the fifth embodiment.

The vehicle according to the fifth embodiment includes a physical quantity sensor according to the invention. In the following, the vehicle including the physical quantity sensor 100 as a physical quantity sensor according to the invention will be described.

The vehicle 1100 according to the fifth embodiment is configured to further include controllers 1120, 1130, and 1140 that perform various controls for an engine system, a brake system, a keyless entry system, and the like, a battery 1150, and a backup battery 1160. In the vehicle 1100 according to the fifth embodiment, a portion of the constituent elements (parts) shown in FIG. 23 may be omitted or modified, or other constituent elements may be added.

Various vehicles are conceivable as the vehicle 1100. Examples thereof include, for example, an automobile (including an electric automobile), aircraft such as a jet plane or a helicopter, a ship, a rocket, and an artificial satellite.

The embodiments and modified examples described above are illustrative only, and the invention is not limited to them. For example, each embodiment and each modified example can be appropriately combined together.

The invention includes configurations (e.g., a configuration having the same function, method, and result, or a configuration having the same advantage and advantageous effect) that is substantially the same as any of the configurations described in the embodiments. Moreover, the invention includes configurations in which a non-essential portion of the configuration described in the embodiments is replaced. Moreover, the invention includes configurations providing the same operational effects as those described in the embodiments, or configurations capable of achieving the same advantages. Moreover, the invention includes configurations in which a publicly known technique is added to the configurations described in the embodiments.

The entire disclosure of Japanese Patent Application No. 2017-061699 filed Mar. 27, 2017 is expressly incorporated by reference herein.

What is claimed is:

1. A physical quantity sensor comprising:
a substrate;
a movable body disposed over the substrate;
a support that supports the movable body via a coupler, the coupler extending in a first direction, the support being fixed to the substrate;
a first fixed electrode disposed on the substrate, the first fixed electrode being located at a first side of the coupler;
a second fixed electrode disposed on the substrate, the second fixed electrode being located at a second side of the coupler, the second side being opposite to the first side, the first and second fixed electrodes being arranged along a second direction orthogonal to the first direction;
a third fixed electrode disposed on the substrate, the third fixed electrode being spaced apart from the movable body and the first and second fixed electrodes in a plan view, the third fixed electrode being electrically connected with one of the first fixed electrode and the second fixed electrode; and
a first dummy electrode that is provided on the substrate, the first dummy electrode being spaced apart from the movable body, the third fixed electrode, and the first and second fixed electrodes in the plan view, the first dummy electrode being disposed laterally immediately adjacent to the third fixed electrode in the plan view, the first dummy electrode having a same potential as the movable body.

2. The physical quantity sensor according to claim 1, wherein the first dummy electrode includes:
a first arm that is provided at a first side of the third fixed electrode in the second direction,
a second arm that is provided at a second side, which is opposite to the first side, of the third fixed electrode in the second direction, and
a third arm that connects the first arm with the second arm.

3. The physical quantity sensor according to claim 2, wherein the movable body includes:
a first movable section that is located at the first side of the coupler in the second direction, and
a second movable section that is located at the second side of the coupler in the second direction and that is shorter in length in the second direction than the first movable section,
the first fixed electrode overlaps the first movable section in the plan view, and
the second fixed electrode overlaps the second movable section in the plan view.

4. The physical quantity sensor according to claim 3, further comprising a second dummy electrode disposed on the substrate,
wherein the second dummy electrode overlaps the first movable section in the plan view, and the second dummy electrode has a same potential as the movable body.

5. The physical quantity sensor according to claim 4, wherein
the second fixed electrode is provided between the first fixed electrode and the third fixed electrode in the plan view, and
the first dummy electrode is provided between the second fixed electrode and the third fixed electrode in the plan view.

6. The physical quantity sensor according to claim 4, wherein
the second dummy electrode is provided next to the first fixed electrode along the second direction, and the second dummy electrode is located at the first side of the coupler,
the first fixed electrode is located closer to the coupler than the second dummy electrode in the plan view, and
the first dummy electrode and the second dummy electrode are electrically connected together.

7. The physical quantity sensor according to claim 6, further comprising a third dummy electrode disposed on the substrate,
wherein the third dummy electrode overlaps the movable body in the plan view, and the third dummy electrode has the same potential as the movable body,
wherein the third dummy electrode is provided between the first fixed electrode and the second fixed electrode in the plan view.

8. The physical quantity sensor according to claim 1, further comprising a second movable body,
wherein the first and second movable bodies are arranged along the second direction.

9. The physical quantity sensor according to claim 1, further comprising a second movable body,
wherein the first and second movable bodies are arranged along the first direction.

10. An electronic apparatus comprising:
the physical quantity sensor according to claim 1;
a central processing unit that performs arithmetic processing based on an output signal from the physical quantity sensor; and
a display unit that displays information in response to control of the central processing unit.

11. A portable electronic apparatus comprising:
the physical quantity sensor according to claim 1;
a central processing unit that performs arithmetic processing based on an output signal from the physical quantity sensor;
a communication unit that performs data communication with an external device;
an operating unit that transmits an operating signal to the central processing unit; and
a display unit that displays information in response to control of the central processing unit.

12. The portable electronic apparatus according to claim 11, further comprising a GPS receiver, wherein
the portable electronic apparatus measures a movement distance and movement path of a user.

13. A vehicle comprising:
the physical quantity sensor according to claim 1;
at least one of an engine system, a brake system, and a keyless entry system; and
a controller that controls at least one of the engine system, the brake system, and the keyless entry system based on an output signal from the physical quantity sensor.

14. A physical quantity sensor comprising:
a substrate;
a post upstanding from the substrate;
a movable body pivotally coupled to the post via a pair of torsional beams, the pair of torsional beams extending in a first direction;
a first fixed electrode provided on the substrate, the first fixed electrode being located at a first side of the pair of torsional beams;
a second fixed electrode provided on the substrate, the second fixed electrode being located at a second side of the pair of torsional beams, the second side being opposite to the first side with respect to the pair of torsional beams;

a third fixed electrode provided on the substrate, the third fixed electrode being laterally spaced apart from an outer periphery of the movable body in a plan view, the third fixed electrode being electrically connected with one of the first fixed electrode and the second fixed electrode; and a first dummy electrode provided on the substrate, the first dummy electrode being laterally immediately adjacent to the third fixed electrode, the first dummy electrode being spaced apart from third fixed electrode and the first and second fixed electrodes in the plan view, the first dummy electrode having a same potential as the movable body.

15. The physical quantity sensor according to claim 14, wherein the first dummy electrode is substantially U-shaped and includes:
    a first arm provided at a first side of the third fixed electrode in a second direction orthogonal to the first direction,
    a second arm provided at a second side, which is opposite to the first side, of the third fixed electrode in the second direction, and
    a third arm connected between the first arm and the second arm.

16. The physical quantity sensor according to claim 15, wherein
    the movable body includes:
        a first mass plate located at the first side of the pair of torsional beams in the second direction, and
        a second mass plate located at the second side of the pair of torsional beams in the second direction, the second mass plate being shorter in length in the second direction than the first mass plate,
    the first mass plate faces the first fixed electrode, and
    the second mass plate faces the second fixed electrode.

17. The physical quantity sensor according to claim 16, further comprising:
    a second dummy electrode provided on the substrate so as to face the first mass plate, the second dummy electrode having a same potential as the movable body.

18. The physical quantity sensor according to claim 17, wherein
    the second fixed electrode is provided laterally between the first fixed electrode and the third fixed electrode, and
    the first dummy electrode is provided laterally between the second fixed electrode and the third fixed electrode.

19. The physical quantity sensor according to claim 17, wherein
    the second dummy electrode is provided next to the first fixed electrode along the second direction, and the second dummy electrode is located at the first side of the pair of torsional beams,
    the first fixed electrode is located closer to the pair of torsional beams than the second dummy electrode in the plan view, and
    the first dummy electrode and the second dummy electrode are electrically connected together.

20. The physical quantity sensor according to claim 19, further comprising:
    a third dummy electrode provided on the substrate so as to face the movable body, the third dummy electrode having a same potential as the movable body,
    wherein the third dummy electrode is provided laterally between the first fixed electrode and the second fixed electrode.

* * * * *